US012605820B2

(12) United States Patent
Chen

(10) Patent No.: US 12,605,820 B2
(45) Date of Patent: Apr. 21, 2026

(54) BRACKET TABLE APPLICABLE TO A STORAGE BOX

(71) Applicant: Nanjing Chervon Industry Co., Ltd., Nanjing (CN)

(72) Inventor: Cheng Chen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/768,314

(22) Filed: Jul. 10, 2024

(65) Prior Publication Data

US 2024/0359311 A1 Oct. 31, 2024

Related U.S. Application Data

(63) Continuation of application No. PCT/CN2023/122404, filed on Sep. 28, 2023.

(30) Foreign Application Priority Data

Oct. 13, 2022 (CN) ......................... 202211251819.6
Oct. 13, 2022 (CN) ......................... 202222702569.5

(51) Int. Cl.
*B25H 3/02* (2006.01)
*B25H 1/04* (2006.01)
(Continued)

(52) U.S. Cl.
CPC .................................... *B25H 3/027* (2013.01)

(58) Field of Classification Search
CPC . B25H 1/04; B25H 3/02; B25H 3/027; B25H 3/04; B65D 21/0201;
(Continued)

(56) References Cited

U.S. PATENT DOCUMENTS 749,670 A * 1/1904 Gardner ............... A47B 57/045 248/240.4
2,284,003 A * 5/1942 Luppert ................... A47B 1/04 248/240.4
(Continued)

FOREIGN PATENT DOCUMENTS

CN 110355732 A 10/2019
CN 114834728 A 8/2022
(Continued)

OTHER PUBLICATIONS

International Search Report of international application No. PCT/CN2023/122404, dated Apr. 18, 2024, 7 pp.

*Primary Examiner* — Anthony D Stashick
*Assistant Examiner* — Marcos Javier Rodriguez Molina
(74) *Attorney, Agent, or Firm* — Greenberg Traurig, LLP

(57) ABSTRACT

A bracket table applicable to a storage box includes at least one support member configured to be interlocked with a storage box and a mounting assembly connected to the support member. The mounting assembly includes a first connector connected to the support member. The support member has at least a first state and a second state relative to the first connector. When the support member is in the first state, the support member is at a first position. When the support member is in the second state, the support member is at a second position.

14 Claims, 23 Drawing Sheets

(51) Int. Cl.

| | |
|---|---|
| *B25H 3/04* | (2006.01) |
| *B65D 6/00* | (2006.01) |
| *B65D 21/02* | (2006.01) |
| *B65D 25/04* | (2006.01) |

(58) Field of Classification Search

CPC ........................ B65D 21/0204; B65D 21/0209; B65D 25/24; B65D 6/08; B65D 7/00; A47B 57/04

USPC .......... 206/1.5, 1.7, 1.8, 216, 223, 234, 304, 206/315.1, 315.11, 349, 350, 355, 359, 206/371, 372, 373, 374, 376, 377, 378, 206/379, 384, 387.11, 387.15, 445, 45.2, 206/45.23, 45.24, 454, 457, 499, 501, 206/503, 506, 508, 511, 514, 526, 527, 206/557, 565, 572, 573, 579, 63.5, 701, 206/710, 742, 743, 748, 751, 756, 759, 206/762, 776; 220/210, 212.5, 23.6, 220/23.83, 23.86, 23.88, 255, 3.8, 315, 220/318, 324, 325, 326, 345.1, 349, 375, 220/4.22, 4.27, 4.28, 4.29, 505, 520, 521, 220/523, 524, 526, 528, 532, 573.1, 220/592.01, 592.2, 592.24, 592.25, 6, 220/660, 690, 691, 694, 7, 751, 755, 756, 220/757, 761, 762, 763, 764, 765, 768, 220/772, 773, 8, 810, 812, 830, 833, 835, 220/902; 248/210, 213, 214, 221.11, 248/221.12, 221.13, 222.13, 222.41, 248/222.51, 223.41, 225.21, 228.4, 229, 248/235, 239, 240, 242, 279.1, 286.1, 248/300, 303, 310, 2

See application file for complete search history.

(56) References Cited

U.S. PATENT DOCUMENTS

| | | | | | |
|---|---|---|---|---|---|
| 4,448,380 | A * | 5/1984 | Huber-Krattiger | A47B 5/04 248/235 |
| 5,381,738 | A * | 1/1995 | Meyer | A47B 5/00 108/42 |
| 5,775,655 | A * | 7/1998 | Schmeets | A47B 5/00 108/115 |
| 5,913,380 | A | 6/1999 | Gugel | |
| 6,026,932 | A * | 2/2000 | Comp | E04G 5/041 248/240.4 |
| 7,175,146 | B2 * | 2/2007 | Kim | F16M 11/10 211/100 |
| 8,132,819 | B2 * | 3/2012 | Landau | B25H 3/027 312/249.4 |
| 10,477,960 | B1 * | 11/2019 | Johnson | A47B 5/02 |
| 2009/0309323 | A1 | 12/2009 | Oliver | |
| 2013/0015183 | A1 | 1/2013 | Fredette | |
| 2013/0118818 | A1 | 5/2013 | Smith | |
| 2016/0109910 | A1 * | 4/2016 | Fan | G06F 1/185 248/286.1 |
| 2022/0097614 | A1 * | 3/2022 | Henry, Jr. | A47B 96/028 |

FOREIGN PATENT DOCUMENTS

| | | | | |
|---|---|---|---|---|
| CN | 218641454 | U | 3/2023 | |
| EP | 0554185 | A1 | 10/1995 | |
| EP | 3593955 | A1 * | 1/2020 | B25H 3/028 |
| JP | H10276839 | A | 10/1998 | |

* cited by examiner

BRACKET TABLE APPLICABLE TO A STORAGE BOX

RELATED APPLICATION INFORMATION

This application is a continuation of International Application Number PCT/CN2023/122404, filed on Sep. 28, 2023, through which this application also claims the benefit under 35 U.S.C. § 119(a) of Chinese Patent Application No. 202211251819.6, filed on Oct. 13, 2022, and Chinese Patent Application No. 202222702569.5, filed on Oct. 13, 2022, which applications are incorporated herein by reference in their entireties.

TECHNICAL FIELD

The present application relates to a bracket table applicable to a storage box.

BACKGROUND

Since a storage box has an accommodation space, tools are usually placed in the storage box, for example, a battery pack, a horizontal scale, a cable, chemicals such as lubricating oil, and a tool worn at any time. When a user does not use the tools, the storage box is usually placed in a warehouse. However, if storage boxes are all stacked together, the user usually needs to remove toolboxes stacked on the lowermost storage box when the user needs to search for tools placed in the lowermost storage box. Thus, the lowermost storage box can be opened. It is very inconvenient for the user to fetch the tools.

SUMMARY

The present application provides a bracket table that can be interlocked with a storage box.

The present application provides a bracket table applicable to a storage box. The bracket table applicable to the storage box includes: at least one support member configured to be interlocked with the storage box; and a mounting assembly connected to the support member. The mounting assembly includes a first connector connected to the support member, where the support member has at least a first state and a second state relative to the first connector, where in the case where the support member is in the first state, the support member is at a first position, and in the case where the support member is in the second state, the support member is at a second position.

As an optional example, the first connector is mounted to at least one of a wall, the ground, a goods shelf, and a wood board.

As an optional example, the bracket table further includes an interlocking assembly, where in the case where the support member is in the first state, the interlocking assembly is configured to mount at least one of a tool, an accessory, a fan unit, a charging device, a power supply device, an illumination device, a storage box, and a workbench to the support member.

As an optional example, the first connector is connected to the support member through at least one of a threaded connection, a mortise and tenon connection, a screw connection, a pin connection, and a snap connection so that the support member is kept at the first position.

As an optional example, the included angle between the support member at the first position and the support member at the second position is greater than or equal to 30 degrees.

As an optional example, the mounting assembly further includes a second connector rotatably connected to the first connector and a third connector connected to the second connector, where the third connector is rotatably connected to the second connector, and the support member is mounted on the third connector.

As an optional example, the second connector is mounted to at least one of a wall, the ground, a goods shelf, and a wood board.

As an optional example, in the case where the support member is at the second position, the included angle between the support member and the second connector is less than 80 degrees.

As an optional example, the bracket table further includes an adjustment guide rail detachably connected to the mounting assembly, where the second connector is mounted to the adjustment guide rail.

As an optional example, multiple snaps are disposed on the adjustment guide rail, and multiple engagement slots are disposed on the second connector, where an engagement slot is engaged with a respective snap, and the number of the multiple snaps on the adjustment guide rail is greater than the number of the multiple engagement slots on the second connector so that the engagement slot on the second connector is engaged with different snaps.

As an optional example, the mounting assembly further includes positioning pins, a resilient member, a driving member, and fasteners, where the fasteners pass through holes of the second connector and through holes of the adjustment guide rail to fixedly connect the second connector to the adjustment guide rail, the first connector connects the second connector to the third connector, two ends of the first connector are each connected to the positioning pins, the third connector is formed with a slideway that is hollow, a positioning pin is configured to move on the slideway, the third connector is fixedly connected to the support member, the resilient member and the driving member are each connected to the third connector, the resilient member has a resilient arm, and the resilient arm is configured to always apply a thrust to the driving member so that an end of the driving member is always in contact with the third connector.

As an optional example, the bracket table further includes an interlocking assembly, where in the case where the support member is at the first position, the interlocking assembly is configured to mount at least one of a tool, an accessory, a fan unit, a charging device, a power supply device, an illumination device, a storage box, and a workbench to the support member.

As an optional example, the interlocking assembly includes a snap assembly including a snap member capable of springing back and a positioning member, where the snap member is connected to the support member, and the positioning member is configured to be disposed on any one of the tool, the accessory, the fan unit, the charging device, the power supply device, the illumination device, the storage box, and the workbench.

As an optional example, the number of mounting assemblies is two, and the number of adjustment guide rails is two.

A bracket table applicable to a storage box includes: at least one support member configured to be interlocked with the storage box; and a mounting assembly connected to the support member. The mounting assembly includes a first connector connected to the support member, where the support member has a first position and a second position, where the included angle between the support member at the first position and the support member at the second position is greater than or equal to 30 degrees.

A toolbox system includes: a first-type storage box having an accommodation cavity, where the accommodation cavity is configured to store an item; a second-type storage box configured to store an item; and a first mounting assembly connected to the first-type storage box. The first mounting assembly is connected to the first-type storage box and the second-type storage box and configured to attach the second-type storage box to a sidewall of the first-type storage box.

As an optional example, the toolbox system further includes a second mounting assembly, where the second mounting assembly is configured to connect the second-type storage box to the top cover of the first-type storage box or the bottom wall of the first-type storage box.

As an optional example, the first mounting assembly includes a first fitting portion and a second fitting portion, where in the case where the first fitting portion mates with the second fitting portion, the first-type storage box and the second-type storage box keep basically fixed relative to each other, and in the case where the first fitting portion is separated from the second fitting portion, the first-type storage box and the second-type storage box are freely moved relative to each other.

As an optional example, the toolbox system further includes an externally connected assembly detachably connected to the first-type storage box, where the first fitting portion and the externally connected assembly are connected to each other or integrally formed, and the second fitting portion and the second-type storage box are connected to each other or integrally formed.

As an optional example, the toolbox system further includes an extension member detachably connected to the externally connected assembly, where the extension member includes a mounting portion, a connecting portion, and an extension portion. The mounting portion is connected to the externally connected assembly, the connection portion is connected to the first-type storage box, and the extension portion is configured to mount an external hanger. The extension portion, the connecting portion, and the mounting portion are sequentially connected to each other, and none of the extension portion, the connecting portion, and the mounting portion are in the same plane.

As an optional example, the externally connected assembly is connected to an interlocking assembly, where the interlocking assembly is configured to lock one of a tool, an accessory, a fan unit, a charging device, a power supply device, an illumination device, and a workbench to a panel of the externally connected assembly. The interlocking assembly includes a snap assembly including a snap member capable of springing back and a positioning member, where the snap member is connected to the panel, and the positioning member is configured to be disposed on any one of the tool, the accessory, the fan unit, the charging device, the power supply device, the illumination device, and the workbench.

As an optional example, the second mounting assembly includes an interlocking assembly including a snap member capable of springing back and a positioning member, where the snap member is connected to the top cover of the first-type storage box, and the positioning member is connected to the bottom wall of the second-type storage box, or the snap member is connected to the top cover of the second-type storage box, and the positioning member is connected to the bottom wall of the first-type storage box.

As an optional example, the toolbox system further includes a support member, where the support member is detachably connected to the externally connected assembly and includes a first connecting end, a second connecting end, and a main support portion connecting the first connecting end to the second connecting end, and the externally connected assembly includes at least one panel, where the first connecting end and the second connecting end are connected to the panel, the main support portion and the panel are spaced, and a hanging slot is formed between the main support portion and the panel.

As an optional example, the externally connected assembly is further connected to a hook portion, where the hook portion is configured to move relative to the panel and has at least an unfolded state and a folded state during the movement.

As an optional example, the panel of the externally connected assembly is provided with at least one positioning hole configured to fixedly connect the externally connected assembly to a to-be-mounted portion.

As an optional example, the to-be-mounted portion is at least one of a wall, the ground, a goods shelf, and a wood board.

As an optional example, the toolbox system further includes a workbench, where the workbench has a first connection state and a second connection state. In the case where the workbench is in the first connection state, the workbench is attached to the top cover of the first-type storage box, and in the case where the workbench is in the second connection state, the workbench is attached to the sidewall of the first-type storage box.

A toolbox system includes: a first-type storage box having an accommodation cavity, where the accommodation cavity is configured to store an item; a workbench configured to be used for the placement of an item; and a first mounting assembly connected to the first-type storage box. The first mounting assembly is connected to the first-type storage box and the workbench and configured to attach the workbench to a sidewall of the first-type storage box.

DETAILED DESCRIPTION

Figure 1:
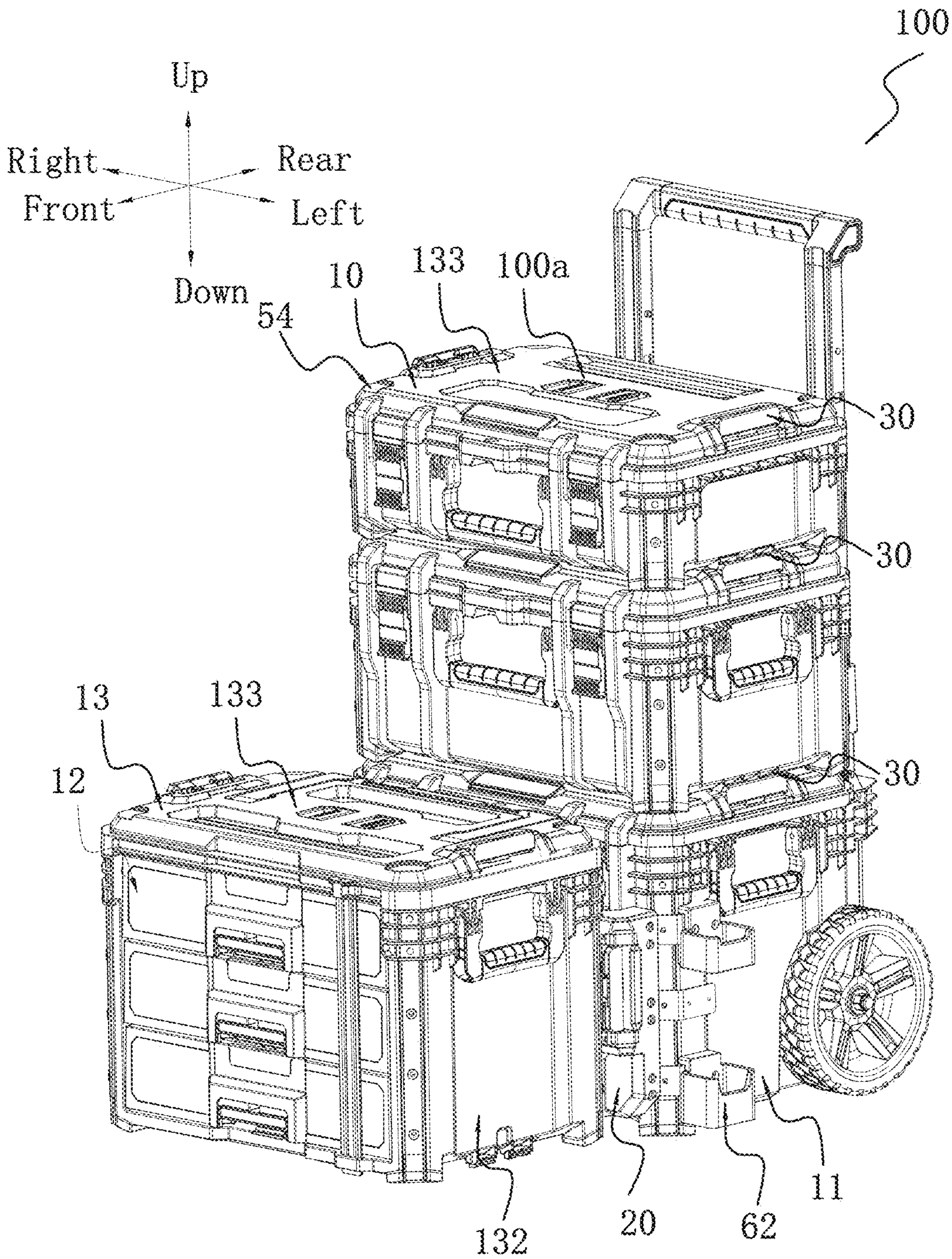
FIG. 1 is a schematic view of a toolbox system.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

FIG. 1 shows a toolbox system 100, which may be configured to store an item, such as an accessory, a tool, a charging device, a power supply device, an illumination device, an accessory case/bag, a tool case, and a workbench 50. The storage of the item described in the present application is not limited to only the storage of the item in a storage box 10 and also includes fixing the item on an outer side of the storage box 10. Alternatively, hanging, absorbing, and placing the item on the outer side of the storage box 10 are also referred to as the storage of the item in the storage box 10.

In the present application, up, down, front, rear, left, and right are defined in FIG. 1. Unless otherwise specified, up and down, front and rear, and left and right are described below with respect to a state where the toolbox system 100 stands still as shown in FIG. 1.

Figure 2:
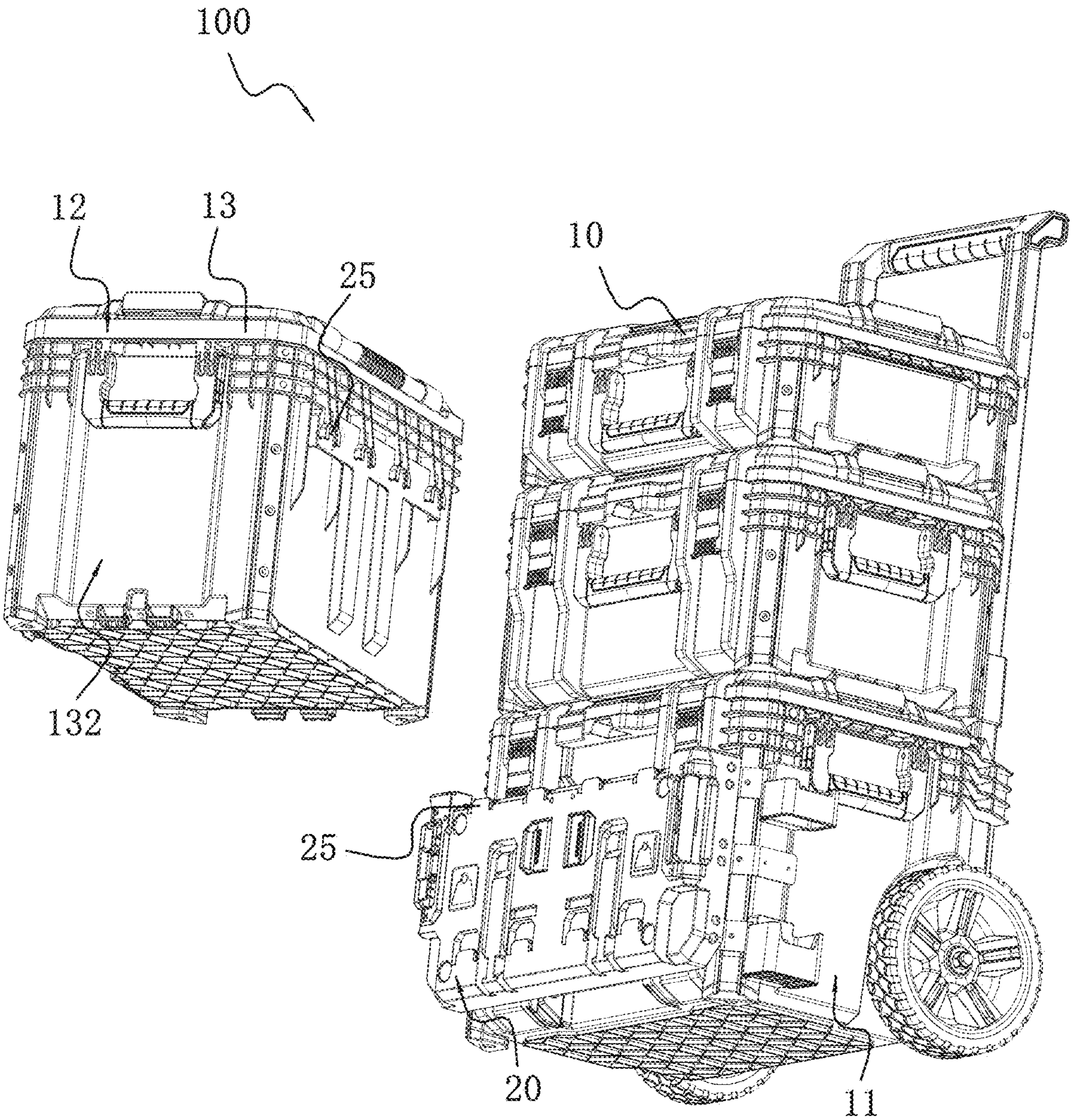
FIG. 2 is a schematic view showing that a storage box and an externally connected assembly in FIG. 1 are separated from each other.
Figure 3:
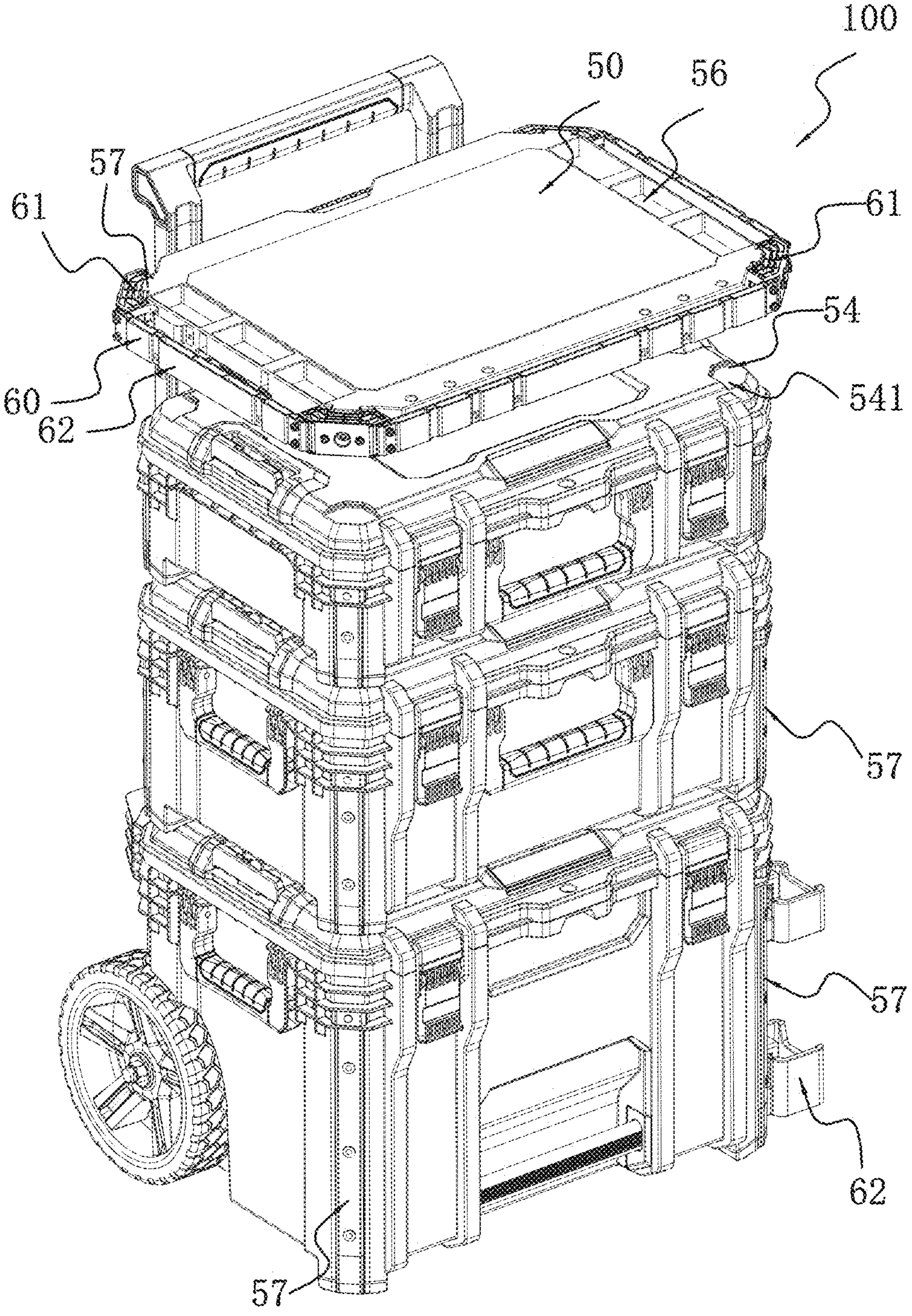
FIG. 3 is a schematic view showing that a workbench and a storage box in a toolbox system are separated from each other.

As shown in FIGS. 1 to 3, a storage device **100*a* is a main part forming the toolbox system 100, where the storage device 100*a* includes at least one storage box 10, and the storage box 10 is formed with an accommodation cavity configured to store the item. The toolbox system 100 may include several storage boxes 10, and the storage boxes 10 may be connected to each other. Multiple types of storage boxes 10 are included in the toolbox system 100. For example, a container box is included in the toolbox system 100. The container box has a box body 132 forming an accommodation cavity, and a top cover 133 basically closing the box body 132. A lock switch is disposed between the box body 132 and the top cover 133 so that the box body 132 and the top cover 133 keep fixed relative to each other. The box body 132 generally includes a front sidewall, a rear sidewall, a left sidewall, a right sidewall, and a bottom sidewall connected to the preceding four sidewalls. Interlocking assemblies 30 are disposed on the top cover 133 of the storage box 10 and can lock storage boxes 10 to each other in an up and down direction. For example, a container basket is included in the toolbox system 100. The container basket has a box body 132 forming an accommodation cavity. The box body 132 is semi-open, that is, no top cover 133 closes the box body 132 and a user can directly fetch the item from the container basket or store the item in the container basket. For example, a drawer box 13 is included in the toolbox system 100. The drawer box 13 is formed with a box body 132 having an opening on a side and one or more drawers. The user may place the item in the drawer and push the drawer into the box body 132. When the user needs to fetch the item to use it, the user may pull out the drawer and fetch the item to use it. The drawer box 13 also includes a structure with a side flap. For example, a movable container box is included in the toolbox system 100. The movable container box differs from the preceding container box in that the movable container box has a movement assembly, that is, wheels rotatable relative to the ground are connected to a box body 132 and can drive the container box to move. The movable container box may also be connected to a handle assembly. The handle assembly may be disposed on a side of the movable container box. The user may hold the handle assembly to move the movable container box according to an actual situation. Unless otherwise indicated, the storage box 10 in the present application refers to one or a combination of several of the container box, the container basket, the drawer box 13**, and the movable container box described above.

As shown in FIGS. 1 and 2, the toolbox system 100 includes at least a first-type storage box 11, a second-type storage box 12, and a first mounting assembly 25. Each of the first-type storage box 11 and the second-type storage box 12 has an accommodation cavity where the item can be placed. The first mounting assembly 25 can attach the second-type storage box 12 to an outer side of the first-type storage box 11. When the second-type storage box 12 is attached to the outer side of the first-type storage box 11, the second-type storage box 12 can move along with the first-type storage box 11. The ratio of the volume of the second-type storage box 12 to the volume of the first-type storage box 11 is higher than or equal to 0.3 and lower than or equal to 3. With this configuration, the first-type storage box 11 is enabled to be connected to more items. The first mounting assembly 25 may be directly formed on the first-type storage box 11 or/and the second-type storage box 12, or the first mounting assembly 25 may be a component independent of the first-type storage box 11 or the second-type storage box 12. The attachment includes a direct connection and an indirect connection, and the direct connection includes a point connection, a surface connection, a line connection, and the like.

As an example, the first mounting assembly 25 is directly formed on the first-type storage box 11 or/and the second-type storage box 12 and includes first fitting portions and second fitting portions. The first fitting portions are directly formed by the first-type storage box 11, and the second fitting portions are directly formed by the second-type storage box 12. In this way, when a first fitting portion mates with a second fitting portion, the first-type storage box 11 and the second-type storage box 12 keep basically fixed relative to each other. When the first fitting portion is separated from the second fitting portion, the first-type storage box 11 and the second-type storage box 12 can be freely moved relative to each other. The first fitting portion may be disposed on a sidewall of the first-type storage box 11, and the second fitting portion may also be disposed on a sidewall of the second-type storage box 12. It is to be noted that it is not defined here which sidewall is specifically provided with the first fitting portion or the second fitting portion. The first fitting portion or the second fitting portion may be disposed on any sidewall as long as the connection between the first-type storage box 11 and the second-type storage box 12 can be implemented.

As another example, the first mounting assembly 25 is the component independent of the first-type storage box 11 and the second-type storage box 12. The first mounting assembly 25 includes the first fitting portion and the second fitting portion, where the first fitting portion is detachably connected to the sidewall of the first-type storage box 11, and the second fitting portion is detachably connected to the sidewall of the second-type storage box 12. Alternatively, the first fitting portion is detachably connected to the sidewall of the first-type storage box 11, and the second fitting portion is directly formed by the second-type storage box 12. Alternatively, the first fitting portion is directly formed by the first-type storage box 11, and the second fitting portion is detachably connected to the sidewall of the second-type storage box 12.

As another example, an intermediate member is detachably connected to the first-type storage box 11, the first mounting assembly 25 is connected to the intermediate member, and the first mounting assembly 25 includes the first fitting portion and the second fitting portion, where the first fitting portion is connected to the intermediate member, and the second fitting portion is connected to the second-type storage box 12.

A specific structure of the first fitting portion and a specific structure of the second fitting portion are not specifically limited in the present application. The following description of the structure of the first fitting portion and the structure of the second fitting portion is one of specific structure manners in which the attachment between the first-type storage box 11 and the second-type storage box 12 can be implemented.

The toolbox system 100 further includes a second mounting assembly. The second mounting assembly can connect the second-type storage box 12 to the top cover of the first-type storage box 11 or the bottom wall of the first-type storage box 11 optionally, which may be understood as follows: the second mounting assembly may mount the second-type storage box 12 to the top cover of the first-type storage box 11, or the second mounting assembly may mount the second-type storage box 12 to the bottom wall of the first-type storage box 11, that is, the second mounting assembly may mount the first-type storage box 11 to the top cover of the second-type storage box 12. The second mounting assembly includes an interlocking assembly including a snap member capable of springing back and a positioning member, where the snap member is connected to the top cover of the first-type storage box 11, and the positioning member is connected to the bottom wall of the second-type storage box 12, or the snap member is connected to the top cover of the second-type storage box 12, and the positioning member is connected to the bottom wall of the first-type storage box 11. With this configuration, a third-type storage box may be connected to the top cover of the first-type storage box 11 by the second mounting assembly, a fourth-type storage box may also be connected to the top cover of the third-type storage box by the second mounting assembly, and the user may connect more storage boxes to the fourth-type storage box. The second-type storage box 12 may be connected to the first-type storage box 11, the third-type storage box, or the fourth-type storage box by the first mounting assembly 25, and the first-type storage box 11 may be connected to wheels. In this way, the user may move the first-type storage box 11 so that the second-type storage box 12, the third-type storage box, and the fourth-type storage box can be moved along with the first-type storage box 11. The first-type storage box 11, the second-type storage box 12, the third-type storage box, and the fourth-type storage box here are only used for describing the connection manners of the first-type storage box 11, the second-type storage box 12, the third-type storage box, and the fourth-type storage box. That is, the first-type storage box 11, the second-type storage box 12, the third-type storage box, and the fourth-type storage box may be the same type of storage boxes or may be different types of storage boxes, or part of the storage boxes may be the same type of storage boxes. In the present application, the structure of the first mounting assembly 25 may be consistent with or may be partially consistent with the structure of the second mounting assembly.

As shown in FIG. 1, FIG. 2, FIGS. 4 to 6, FIG. 14, and FIG. 15, the first mounting assembly 25 may attach the second-type storage box 12 to the sidewall of the first-type storage box 11. That is, when the second-type storage box 12 is attached to the first-type storage box 11, the second-type storage box 12 can move along with the first-type storage box 11, and when the second-type storage box 12 is separated from the first-type storage box 11, the first-type storage box 11 and the second-type storage box 12 can be freely moved relative to each other. The toolbox system 100 includes an externally connected assembly 20 disposed outside the accommodation cavity. The externally connected assembly 20 may be understood as the intermediate member described above. The externally connected assembly 20 is configured such that a tool, an accessory, a charging device, a power supply device, an illumination device, the storage box 10, and the like are externally hung on the externally connected assembly 20. The externally connected assembly 20 may be fixedly connected to the first-type storage box 11 in a removable manner. In addition, the externally connected assembly 20 is provided with one or several positioning holes 211. The positioning hole 211 is configured to fixedly connect the externally connected assembly 20 to a to-be-mounted portion 221. The to-be-mounted portion 221 may be a wall, the ground, a goods shelf, a wood board, or the like. Specifically, the externally connected assembly 20 is provided with four positioning holes 211. A panel 21 of the externally connected assembly 20 is provided with the four positioning holes 211. The positioning holes 211 are located at four corners of the panel 21 separately, and the user may cause screws to pass through the preceding positioning holes 211 to fix the externally connected assembly 20 to the to-be-mounted portion 221. If the user needs to remove the externally connected assembly 20 or change the position where the externally connected assembly 20 is mounted, the user only needs to remove the screws from the positioning holes 211 and then needs to remove the externally connected assembly 20 from the to-be-mounted portion 221. If the mounting position needs to be changed, the user only needs to cause the screws to pass through the preceding positioning holes 211 again to fix the externally connected assembly 20 to a new to-be-mounted portion 221. The externally connected assembly 20 includes the panel 21, and the panel 21 is disposed on the front side of the externally connected assembly 20.

Extension members 22 are detachably connected to the externally connected assembly 20 and basically disposed on the rear side of the externally connected assembly 20 to be opposite to the panel 21. An extension member 22 is configured to connect the externally connected assembly 20 to the first-type storage box 11. The extension member 22 may be connected to the box body 132 of the first-type storage box 11, that is, the extension member 22 is detachably connected to the sidewall of the first-type storage box 11. When the user needs to mount the externally connected assembly 20 to the first-type storage box 11, the extension members 22 need to be mounted, and when the user needs to mount the externally connected assembly 20 to the wall, the extension members 22 need to be removed.

The extension member 22 includes at least one mounting portion 221 and a connecting portion 222, where the mounting portion 221 is configured to be fixedly connected to the externally connected assembly 20, and the connecting portion 222 is configured to be fixedly connected to the first-type storage box 11. The mounting portion 221 and the connecting portion 222 are fixedly connected to each other or integrally formed. For example, the mounting portion 221 and the connecting portion 222 are integrally formed. A connecting segment 57 is disposed at a corner of the first-type storage box 11, and the connecting portion 222 may be connected to the connecting segment 57 of the first-type storage box 11 through one or a combination of several of a screw, a pin, a rivet, and a movable snap 422. The connecting segment 57 is formed with a mounting surface, the connecting portion 222 is formed with through holes, and the user may cause screws to pass through the through holes so that the extension member 22 is fastened on the mounting surface by the connecting portion 222. The mounting portion 221 may be connected to the connecting segment 57 of the first-type storage box 11 through one or a combination of several of a screw, a pin, a rivet, and a movable snap 422. The mounting portion 221 is U-shaped, that is, the mounting portion 221 has a first mounting plate 2211, a second mounting plate 2212, and a third mounting plate 2213. The first mounting plate 2211 and the second mounting plate 2212 are spaced. The third mounting plate 2213 connects the first mounting plate 2211 to the second mounting plate 2212. The second mounting plate 2212 is connected to the connecting portion 222. Each of the first mounting plate 2211 and the second mounting plate 2212 is provided with through holes, and the user may cause bolts 2214 to pass through connecting holes of the mounting portion 221, the through holes of the first mounting plate 2211, and the through holes of the second mounting plate 2212 and then may screw up the bolts 2214 with nuts 2215. To ensure the stability of the connection, several extension members 22 may be used for connecting the externally connected assembly 20 to the first-type storage box 11. Unless otherwise indicated, the connecting segment 57 of the storage box 11 also belongs to the sidewall of the storage box 11.

As an example, the extension member 22 further includes an extension portion 223. For the extension portion 223, the mounting portion 221, and the connecting portion 222, the connecting portion 222 is disposed between the extension portion 223 and the mounting portion 221, and the connecting portion 222, the extension portion 223, and the mounting portion 221 are fixedly connected to each other or integrally formed, for example, the connecting portion 222, the extension portion 223, and the mounting portion 221 are integrally formed. The extension portion 223 is configured to mount an external hanger 62. The external hanger 62 is configured to connect the tool, the accessory, a fan unit, the charging device, the power supply device, the illumination device, and the like. The extension portion 223, the connecting portion 222, and the mounting portion 221 are not in the same plane, are sequentially connected to each other, and are configured to be inclined relative to each other. In this example, the extension member 22 may be made of a metal material.

Interlocking assemblies 30 are further included on the externally connected assembly 20 and basically disposed on the front side of the externally connected assembly 20. An interlocking assembly 30 is configured to lock the tool, the accessory, the fan unit, the charging device, the power supply device, the illumination device, the workbench 50, and the like. An interlocking assembly 30 refers to a removable connection manner between the externally connected assembly 20 and the tool, the accessory, the fan unit, the charging device, the power supply device, the illumination device, the workbench 50, or the like. For example, the two may be connected through a snap connection, a threaded connection, a screw connection, adsorption, or the like. Of course, the two may be connected through a combination of multiple connection manners. In the present application, the snap connection is used. That is, the interlocking assemblies 30 are snap assemblies 31 disposed on two sides of the externally connected assembly 20. The snap assemblies 31 on the two sides have structures basically consistent with each other. A snap assembly 31 includes a snap member 311 capable of springing back and a positioning member 312. The snap 422 member 311 capable of springing back is mounted on the externally connected assembly 20, and the positioning member 312 is disposed on any one of the preceding structures. When the positioning member 312 and the snap member 311 are interlocked with each other, no external force is applied to the snap member 311, and the positioning member 312 and the snap member 311 always keep in close contact with each other. If the user needs to unlock the structure from the externally connected assembly 20, the user only needs to turn the snap member 311 outwards to separate the snap member 311 from the positioning member 312 so that the structure can be unlocked from the externally connected assembly 20.

The externally connected assembly 20 may be externally connected to support members 23. A support member 23 is configured to connect another external hanger 62, a power tool, a power tool accessory, a battery pack, the fan unit, the accessory case/bag, a charger, or the like. The support member 23 may be fixedly connected to the panel 21 of the externally connected member 20 in a detachable manner. The support member 23 includes a first connecting end 231, a second connecting end 232, and a main support portion 233 connecting the first connecting end 231 to the second connecting end 232. The first connecting end 231 and the second connecting end 232 are fixedly connected to the externally connected assembly 20. The main support portion 233 and the panel 21 of the externally connected assembly 20 are spaced. A hanging slot 234 is formed between the support member 23 and the externally connected assembly 20. Another external hanger 62, the power tool, the power tool accessory, the battery pack, the fan unit, the accessory case/bag, the charger, or the like may be hung in the hanging slot 234. One or more support members 23 may be disposed on the externally connected assembly 20, and the support members 23 may be disposed side by side. Along a left and right direction, the interlocking assemblies 30 are disposed on two sides of the support members 23. Since the interlocking assemblies 30 are connected to the externally connected assembly 20, the user needs to detach the support members 23 from the externally connected member 20 when the user needs to use the interlocking assemblies 30 to lock the item so that interference to the interlocking assemblies 30 is avoided and the effect on the stability of the connections of the interlocking assemblies 30 is avoided. When the user needs to use the function of the support member 23, the user may mount the support member 23 to the externally connected assembly 20.

The externally connected assembly 20 is further connected to hook portions 24. A hook portion 24 is connected to the panel 21 of the externally connected assembly 20, and the hook portion 24 is movable relative to the externally connected assembly 20, that is, the hook portion 24 has at least two states during the movement, an unfolded state and a contained state. The user may turn the hook portion 24 so that the hook portion 24 is rotatable relative to the panel 21 of the externally connected assembly 20. The hook portion 24 includes a body 241 and a rotary portion 242 that are fixedly connected to each other or integrally formed. The body 241 may be formed with a bracket 243, and the user may place the item or the like on the body 241. The rotary portion 242 is connected to the externally connected assembly 20 and drives the body 241 to rotate relative to the externally connected assembly 20. The joint between the rotary portion 242 and the externally connected assembly 20 is basically disposed at the lower end of the externally connected assembly 20, where the body 241 is hollow. Recessed accommodation slots 244 are disposed on the panel 21 of the externally connected assembly 20. In this way, when the hook portion 24 is in the contained state, the body 241 can be basically accommodated in an accommodation cavity 244 so that the hook portion 24 does not affect the use of a function of another component on the externally connected assembly 20. When the user turns the hook portion 24 to the unfolded state, the hook portion 24 is unfolded. In this case, the body 241 and the panel 21 of the externally connected assembly 20 are approximately at a right angle. That is, the bracket 243 is formed between the body 241 and the externally connected assembly 20, and the user may place the item or the like on the body 241. When the user does not need the hook portion 24, the hook portion 24 may be turned to the contained state. In this case, the hook portion 24 is contained in the accommodation slot 244 of the panel 21. In this example, two hook portions 24 are disposed on the externally connected assemblies 20. The externally connected assembly 20 is connected to the first mounting assembly 25. The first mounting assembly 25 is connected to the second-type storage box 12 so that the externally connected assembly 20 and the second-type storage box 12 keep fixed relative to each other. The first mounting assembly 25 includes first fitting portions 251 and second fitting portions 252. When a first fitting portion 251 mates with a second fitting portion 252, the externally connected assembly 20 and the second-type storage box 12 keep fixed relative to each other. That is, the first fitting portion 251 may be separated from the second fitting portion 252. When the first fitting portion 251 is separated from the second fitting portion 252, the first-type storage box 11 and the second-type storage box 12 can be freely moved relative to each other. The first fitting portion 251 and the externally connected assembly 20 are fixedly connected to each other or integrally formed, and the second fitting portion 252 and the second-type storage box 12 are fixedly connected to each other or integrally formed. As an example, the first fitting portion 251 and the externally connected assembly 20 are integrally formed, the second fitting portion 252 and the second-type storage box 12 are integrally formed, and the first fitting portion 251 guides the second fitting portion 252 to slide along a preset direction to a corresponding position and be engaged at the corresponding position so that the externally connected assembly 20 and the second-type storage box 12 keep fixed relative to each other. The body of the first fitting portion 251 is approximately T-shaped. Along the left and right direction, the first fitting portion 251 has a first stopper portion 2511 and a second stopper portion 2512, where the first stopper portion 2511 and the second stopper portion 2512 mate with the second fitting portion 252 to restrain the second-type storage box 12 from moving along the left and right direction. Along the up and down direction, the first fitting portion 251 has a first guide portion 2513 and a third stopper portion 2514, where the first guide portion 2513 is configured to guide the second fitting portion 252 to slide along the preset direction 101, and the third stopper portion 2514 mates with the second fitting portion 252 to restrain the second-type storage box 12 from moving downwards. The second fitting portion 252 is an engagement slot that is approximately U-shaped. Along the left and right direction, the second fitting portion 252 includes a first stopper slot 2521 and a second stopper slot 2522. When the second fitting portion 252 is engaged with the first fitting portion 251, the first stopper portion 2511 and the second stopper portion 2512 are engaged with the first stopper slot 2521 and the second stopper slot 2522 so that the second-type storage box 12 is restrained from moving in the left and right direction. In addition, each of the first stopper slot 2521 and the second stopper slot 2522 is approximately U-shaped, that is, the first stopper portion 2511 and the second stopper portion 2512 are engaged with the first stopper slot 2521 and the second stopper slot 2522, and the first stopper slot 2521 and the second stopper slot 2522 can simultaneously restrain the second-type storage box 12 from moving in a front and rear direction. The second fitting portion 252 further includes a third stopper slot 2523 disposed between the first stopper slot 2521 and the second stopper slot 2522. When the second fitting portion 252 is engaged with the first fitting portion 251, the third stopper slot 2523 mates with the third stopper portion 2514 to restrain the second-type storage box 12 from moving downwards. When the user needs to mount the second-type storage box 12 to the externally connected assembly 20, the user only needs to slide the second fitting portion 252 on the second-type storage box 12 downwards to engage the second fitting portion 252 with the first fitting portion 251 so that the connection between the second-type storage box 12 and the externally connected assembly 20 can be implemented. When the user needs to detach the second-type storage box 12 from the externally connected assembly 20, the user only needs to lift the second-type storage box 12 upwards relative to the externally connected assembly 20 so that the second-type storage box 12 can be separated from the externally connected assembly 20. With the preceding structural configurations, in one aspect, the stability of the connection between the externally connected assembly 20 and the second-type storage box 12 can be effectively ensured, and in another aspect, it is convenient for the user to mount or detach the storage boxes 10. In the present application, the first-type storage box 11 and the second-type storage box 12 do not refer to particular storage boxes 10 but are only intended to indicate that the externally connected assembly 20 can implement the function of simultaneously fixing two storage boxes 10 side by side. The first-type storage box 11 and the second-type storage box 12 may be the same type of storage boxes 10 or different types of storage boxes 10.

Along the left and right direction, multiple first fitting portions 251 are disposed on the externally connected assembly 20 and multiple second fitting portions 252 mating with the first fitting portions 251 are also disposed on the storage box 10 so that the stability of the connection between the externally connected assembly 20 and the storage box 10 is ensured. Along the up and down direction, at least two rows of first fitting portions 251 are disposed on the externally connected assembly 20, and two rows of first fitting portions 251 are disposed on the upper side and lower side of the externally connected assembly 20 separately. With this configuration, the storage box 10 may be optionally connected to the first fitting portions 251 on the upper side or may be connected to the first fitting portions 251 on the lower side. The user may select a mounting position according to the actual situation. The preceding structure is not limited to the storage box 10 and may be another item. That is, the second fitting portion 252 is connected to the item so that the item can be connected to the externally connected assembly 20.

The externally connected assembly 20 may be fixedly connected to the movable container box by the extension members 22. Thus, when using the movable container box, the user can cause, in one aspect, the externally connected assembly 20 to move along with the movable container box. Thus, when the user connects the storage box 10 to the externally connected assembly 20, the user can push/pull the movable container box to enable the storage box 10 to move along with the movable container box or can connect tools, accessories, and the like to the support members 23. In another aspect, after connecting the externally connected assembly 20 to the movable container box, the user may turn the hook portions 24 to cause them to be in the unfolded state. Thus, the combination of the externally connected assembly 20 with the movable container box can approximately form a “forklift truck”, and the user may place the item on the “forklift truck”. To ensure the stability of the connection, a rope may be used to pass through the body 241 of each of the hook portions 24 and tie the item simultaneously. Finally, the rope is fixed on the handle assembly, or of course, the rope may be fixed at another position as long as it is ensured that the item is fixed on the “forklift truck”. The user may detach the extension members 22 from the externally connected assembly 20, fix the externally connected assembly 20 on the wall by using screws, and connect corresponding items to the externally connected assembly 20 according to needs.

As an example, the panel 21 of the externally connected assembly 20 is constituted by multiple small panels. Each small panel is fixedly connected to or integrally formed with one or several first fitting portions 251, where one or more small panels may be provided. In the present application, the number of small panels constituting the panel 21 is not limited as long as the connection to the preceding structure can be implemented.

As shown in FIG. 1, FIG. 2, FIGS. 7 to 11, the drawer box 13 includes a layered box 131 and the box body 132. The drawer box 13 may be provided with one or more layered boxes 131 according to different needs. The layered box 131 is disposed in the box body 132 and may reciprocate along rails disposed in the box body 132. Interlocking assemblies 30 are disposed on the upper side of the drawer box 13, that is, the drawer box 13 may be stacked on the storage box 10. For example, the drawer box 13 may be interlocked with the movable container box. Thus, when the user pushes/pulls the movable container box, the drawer box 13 can be driven to move along with the movable container box. Of course, another item or the storage box 10 may be stacked on the drawer box 13.

The three-layer drawer box 13 shown in FIG. 1 is used as an example, and the three-layer drawer box 13 may be understood as a drawer box 13 with three layered boxes 131. The drawer box 13 includes rail assemblies 134. A rail assembly 134 is disposed on two sides of each layered box 131 and configured to guide each layered box 131 to reciprocate along a first direction 102. Each layered box 131 can independently slide relative to the box body 132. The drawer box 13 further includes connecting assemblies 135. A connecting assembly 135 is configured to cause the layered box 131 and the box body 132 to keep fixed to each other so that the layered box 131 is prevented from sliding out of the box body 132 without being driven by an external force. For example, during some movements, the layered box 131 slides out of the box body 132, resulting in that the item placed in the box body 132 falls. The layered box 131 has a locked state and an unlocked state relative to the box body 132. When the layered box 131 is in the locked state, the layered box 131 and the box body 132 keep fixed relative to each other without being driven by the external force. When the layered box 131 is in the unlocked state, the layered box 131 can slide backwards and forwards along the first direction 102 without being separated from the box body 132.

The connecting assembly 135 includes a first stopper member 1351, a second stopper member 1352, biasing members 1353, and a locking member 1354. The locking member 1354 and the box body 132 are fixedly connected to each other or integrally formed. The locking member 1354 and the second stopper member 1352 can mate with each other so that the layered box 131 and the box body 132 keep fixed relative to each other. The biasing members 1353 are disposed between the second stopper member 1352 and the first stopper member 1351 and always apply downward biasing forces to the second stopper member 1352. The first stopper member 1351 and the layered box 131 are fixedly connected to each other or integrally formed. A locking portion 1356 is formed on the locking member 1354, and an engagement portion 1355 is disposed on the second stopper member 1352. When the locking portion 1356 mates with the engagement portion 1355, the layered box 131 is in the locked state, and when the locking portion 1356 is separated from the engagement portion 1355, the layered box 131 is in the unlocked state. In this example, the first stopper member 1351 and the layered box 131 are integrally formed. That is, the layered box 131 is formed with an accommodation cavity, the biasing members 1353 are disposed in the accommodation cavity, the second stopper member 1352 is at least partially disposed in the accommodation cavity and can synchronously move along with the first stopper member 1351, and one end of a biasing member 1353 abuts against the layered box 131 and the other end of the biasing member 1353 abuts against the second stopper member 1352. When being mounted, the biasing members 1353 are provided with preload so that the biasing members 1353 always apply the downward biasing forces to the second stopper member 1352. The biasing forces cause the locking portion 1356 and the engagement portion 1355 to always keep mating with each other when the layered box 131 is in the locked state.

The locking portion 1356 is disposed on the movement path of the engagement portion 1355, the locking portion 1356 may be a hole, the engagement portion 1355 is a downward protrusion on the second stopper member 1352, and the biasing forces applied to the second stopper member 1352 by the biasing members 1353 cause the protrusion to always keep engaged in the hole without being affected by an external force. When the layered box 131 is in the locked state, the protrusion is engaged in the hole. When the layered box 131 needs to be unlocked, the user only needs to apply an upward force to the second stopper member 1352 to overcome the biasing forces so that the protrusion is separated from the hole, and the layered box 131 can slide out of the box body 132. When the user needs to lock the layered box 131, the user only needs to push the layered box 131 into the box body 132, and the biasing members 1353 apply the biasing forces to the second stopper member 1352 until the protrusion is engaged in the hole so that the layered box 131 and the box body 132 keep fixed relative to each other. In this example, the drawer box 13 has the three layered boxes 131, and each of the three layered boxes 131 may be locked to the box body 132 in the preceding manner. The details are not repeated here. In this example, two biasing members 1353 may be provided.

The drawer box 13 further includes a locking plate 136 that can prevent the layered boxes 131 from sliding out of the box body 132 The locking plate 136 is disposed on the front side of the drawer box 13 and passes all the layered boxes 131 of the drawer box 13. Two hollow protrusions are formed on the front box body 132 of the drawer box 13, which are a first protrusion portion 1361 and a second protrusion portion 1362 separately. The first protrusion portion 1361 and the second protrusion portion 1362 are spaced from each other. The locking plate 136 can be inserted into the first protrusion portion 1361 and the second protrusion portion 1362. Along the up and down direction, the first protrusion portion 1361 and the second protrusion portion 1362 are disposed on two sides of all the layered boxes 131 of the drawer box 13. The locking plate 136 is elongated. With this configuration, after the locking plate 136 is inserted into the first protrusion portion 1361 and the second protrusion portion 1362, the locking plate 136 can better prevent the layered boxes 131 from sliding out of the box body 132, ensuring the stability of the connection between the layered boxes 131 and the box body 132.

The locking plate 136 includes an elongated portion 1363 and a bent portion 1364. The elongated portion 1363 and the bent portion 1364 are fixedly connected to each other or integrally formed. The elongated portion 1363 and the bent portion 1364 are configured to be inclined. For example, the elongated portion 1363 and the bent portion 1364 are configured to be at a right angle. The locking plate 136 is inserted downwards into the first protrusion portion 1361 and the second protrusion portion 1362 until the locking plate 136 stops moving downwards after the bent portion 1364 is in contact with the first protrusion portion 1361. The first protrusion portion 1361 and the bent portion 1364 are further formed with corresponding locking holes 1365. The user may lock the locking plate 136 and the box body 132 with a padlock so that the stability of the connection between the layered boxes 131 and the box body 132 is further ensured and thefts can be prevented.

The box body 132 is formed with a container slot 1366. The container slot 1366 is configured to be used for the placement of the locking plate 136. That is, when the user does not need the locking plate 136, the locking plate 136 may be placed in the container slot 1366 so that it is convenient for the user to use the locking plate 136 next time. The box body 132 is provided with the container slot 1366, and the locking plate 136 may be inserted into the container slot 1366 along a direction. The container slot 1366 may be disposed on the upper side or lower side of the layered boxes 131. Thus, the locking plate 136 does not interfere with the layered boxes 131 when the user inserts the locking plate 136 into the container slot 1366. In another configuration manner, the container box 1366 may be formed on a side surface of the box body 132. Thus, when the user does not use the locking plate 136, the user may directly insert the locking plate 136 into the container slot 1366 on the side surface. The container slot 1366 may be disposed on any side surface of the box body 132 except the side surface on which the layered boxes 131 are drawn out.

FIGS. 17 to 20 show a foldable bracket table 40, where the bracket table 40 includes at least one support member 41 that may be configured to be used for the placement of the items, the storage boxes 10, and the like. The bracket table 40 may be fixed to a wall, the ground, a goods shelf, a wood board, or adjustment guide rails 42.

Figure 22:
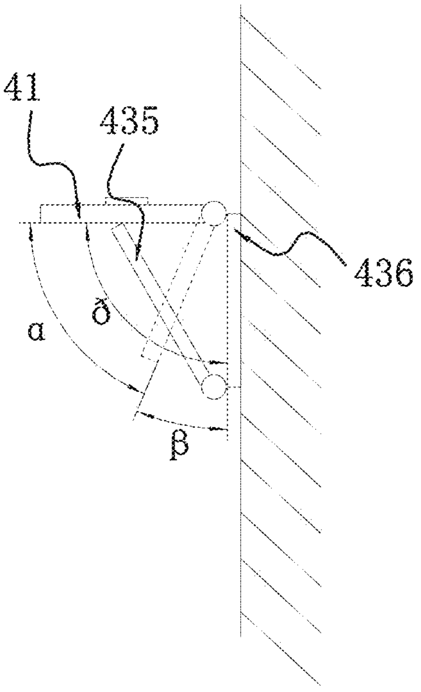
FIG. 22 is a simplified diagram of a bracket table in a first state and a second state.

The bracket table 40 further includes mounting assemblies 43 connected to the support member 41. A mounting assembly 43 includes a first connector 435 connected to the support member 41. The support member 41 has a first state and a second state relative to the first connector 435. When the support member 41 is in the first state, the support member 41 is at a first position, and in this case, the user may place the items, the storage boxes 10, and the like on the support member 41. When the support member 41 is in the second state, the support member 41 is at a second position, and in this case, the support member 41 and the adjustment guide rails 42 occupy a relatively small space. If the user does not use the support member 41 for placing the items, the storage boxes 10, and the like, the support member 41 may be in the second state, thereby reasonably using a space. That is to say, the support member 41 has at least two positions relative to the first connector 435. That is, the included angle α between the support member 41 at the first position and the support member 41 at the second position is greater than or equal to 30 degrees (as shown in FIG. 22).

Figure 21:
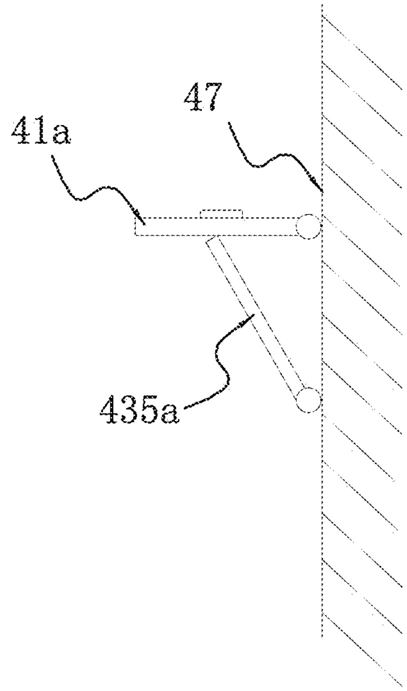
FIG. 21 is a schematic view of a bracket table.

As an example, as shown in FIG. 21, a first connector 435*a* is rotatably connected to a to-be-connected portion 47, and a support member 41*a* is rotatably connected to the to-be-connected portion 47. When the support member 41*a* is in the first state, the first connector 435*a* abuts against the support member 41*a*, and the first connector 435*a* and the support member 41*a* keep fixed relative to each other. When the support member 41*a* is in the second state, the first connector 435*a* is separated from the support member 41*a*. In this case, the support member 41*a* loses support. Affected by gravity, the other end of the support member 41*a* connected to the to-be-connected portion 47 falls down. The first connector 435*a* may be connected to the support member 41*a* through one or a combination of several of a threaded connection, a mortise and tenon connection, a screw connection, a pin connection, and a snap connection. The connection manner between the first connector 435*a* and the support member 41*a* is not limited here as long as a detachable connection between the first connector 435*a* and the support member 41*a* can be implemented. The to-be-connected portion 47 may be one of the wall, the ground, the goods shelf, and the wood board. That is to say, the first connector 435*a* and the support member 41*a* can be directly mounted to one or a combination of several of the wall, the ground, the goods shelf, and the wood board. The to-be-connected portion 47 is detachably connected to the wall, the ground, the goods shelf, and the wood board.

As shown in FIGS. 17 to 20, two adjustment guide rails 42 are provided, a certain space exists between the adjustment guide rails 42, and the adjustment guide rails 42 may be mounted to the wall or the wood board to keep relatively fixed. The bracket table 40 is mounted to the adjustment guide rails 42. The mounting assemblies 43 are connected to the adjustment guide rails 42. The number of the adjustment guide rails 42 is two. Similarly, the number of the mounting assemblies 43 fixedly connected to the adjustment guide rails 42 is also two. The two mounting assemblies 43 are connected to the support member 41. In this example, the adjustment guide rails 42 and the mounting assemblies 43 are basically disposed symmetrically. That is to say, the structures of the adjustment guide rails 42 and the mounting assemblies 43 are basically consistent with each other. To avoid the repetition of the details, only one group of structures is used as an example for description here.

The mounting assembly 43 includes a third connector 431, positioning pins 432, a resilient member 433, a driving member 434, first connectors 435, a second connector 436, and fasteners 437.

Each of the second connector 436 and an adjustment guide rail 42 is formed with several through holes. The fasteners 437 may pass through the through holes of the second connector 436 and the through holes of the adjustment guide rail 42 to fixedly connect the second connector 436 to the adjustment guide rail 42. Several engagement slots 421 spaced according to the same proportion are further formed on the second connector 436. Similarly, multiple snaps 422 are also disposed on the adjustment guide rail 42 according to the same proportion. That is, an engagement slot 421 may be engaged with a respective snap 422 to restrain the second connector 436 from moving downwards. The user may engage the engagement slots 421 on the second connector 436 with the snaps 422 and then may use the fasteners 437 to pass through the through holes of the second connector 436 and the through holes of the adjustment guide rail 42 to fix the second connector 436 and the adjustment guide rail 42. Thus, not only is the second connector 436 prevented from moving freely, but also the stability of the connection between the second connector 436 and the adjustment guide rail 42 is ensured.

The bracket table 40 is mounted on the adjustment guide rails 42, the second connector 436 is mounted on the adjustment guide rail 42, and the bracket table 40 can be folded relative to the adjustment guide rail 42, which may be understood as follows: the support member 41 can be unfolded or folded relative to the second connector 436. That is, the support member 41 also has a first state and a second state relative to the second connector 436. When the support member 41 is in the first state, an angle đ at which the support member 41 intersects with the second connector 436 is greater than or equal to 80 degrees and less than or equal to 100 degrees. In this case, the user can place the items, the storage boxes 10, and the like on the support member 41. When the support member 41 is in the second state, an angle β at which the support member 41 intersects with the second connector 436 is less than 80 degrees. In this case, the support member 41 and the second connector 436 occupy a relatively small space. If the user does not use the support member 41 for the placement of the items, the storage boxes 10, and the like, the support member 41 may be allowed to be in the second state, thereby reasonably using a space.

The first connector 435 connects the second connector 436 to the third connector 431 and is rotatable relative to the second connector 436. Two first connectors 435 may be provided, and two ends of each of the two first connectors 435 are each connected to the positioning pins 432. That is, the two first connectors 435 are connected to the second connector 436 and the third connector 431 by the positioning pins 432. The first connectors 435 are disposed on two sides of the second connector 436, and the positioning pins 432 pass through the first connectors 435. With this configuration, the first connectors 435 are caused to be rotatable relative to the second connector 436. In addition, without an external force, the other ends of the first connectors 435 that are not connected to the second connector 436 move downwards under the action of gravity. The third connector 431 is fixedly connected to the support member 41. The third connector 431 is rotatably connected to the second connector 436, that is, the third connector 431 is rotatable about a first rotation axis 103. The third connector 431 is formed with a hollow slideway 439. The other ends of the first connectors 435 are disposed on two sides of the slideway 439. That is, a positioning pin 432 passes through the first connectors 435 and the slideway 439 to connect the first connectors 435 to the third connector 431. Along an extension direction of the third connector 431, the slideway 439 has a front edge 45 and a rear edge 46 that are disposed on two sides of the slideway 439. Since the slideway 439 has a certain length, the positioning pin 432 is slidable in the slideway 439 without being driven by an external force, which may be understood as follows: the positioning pin 432 is slidable between the front edge 45 and the rear edge 46. The front edge 45 is farther from the first rotation axis 103 than the rear edge 46.

The resilient member 433 is basically fixed on the third connector 431. The resilient member 433 has a resilient arm 44, and the resilient arm 44 abuts against the driving member 434 and always applies a thrust to the driving member 434. The driving member 434 is connected to the third connector 431 and is rotatable relative to the third connector 431. The driving member 434 includes a front end and a rear end that are disposed on two sides of the driving member 434. Along an extension direction of the driving member 434, the rear end is closer to the second connector 436 than the front end. Since the resilient arm 44 always applies the thrust to the driving member 434, the preceding thrust causes one end of the driving member 434 to be always in contact with the third connector 431 in the case where the driving member 434 is not driven by an external force. In this example, the positioning pin 432 connected to the first connector 435 is slidable in the slideway 439. In the process where the positioning pin 432 slides, the rear end of the driving member 434 abuts against the positioning pin 432 and restrains the movement of the positioning pin 432. Without being driven by an external force, the driving member 434 always abuts against the third connector 431. That is to say, the rear end of the driving member 434 always abuts against the positioning pin 432 so that the positioning member 41 is in the first state.

If the user needs to cause the support member 41 to be in the second state, the user only needs to press the driving member 434 to overcome the thrust applied to the driving member 434 by the resilient arm 44 so that the rear end of the driving member 434 is separated from the positioning pin 432. Thus, the positioning pin 432 can continue sliding in an opposite direction in the slideway 439. In addition, in this case, the first connector 435 does not abut against the third connector 431, and affected by gravity, the front end of the third connector 431 approaches the second connector 436, that is, the support member 41 is folded downwards to be in the second state. If the user needs to cause the support member 41 to be in the first state, the user only needs to apply a force to lift one end of the support member 41 upwards. In this case, the third connector 431 fixedly connected to the support member 41 is lifted upwards about the first rotation axis 103. In the process where the third connector 431 is lifted upwards, the positioning pin 432 slides rearwards in the slideway 439 to be in contact with the driving member 434 for the first time. In this case, the user continues applying the force to the support member 41, the force is transferred to the positioning pin 432 so that the positioning pin 432 overcomes the thrust applied to the driving member 434 by the resilient arm 44 and continues moving rearwards to the rear edge 46 of the slideway 439. After the driving member 434 loses the external force, the thrust applied to the driving member 434 by the resilient arm 44 causes the rear end of the driving member 434 to be restored to the state of abutting against the third connector 431. After the user removes the force applied to the support member 41, the third connector 431, the first connector 435, the positioning pin 432, and the like are affected by gravity to move downwards. That is, the positioning pin 432 moves forwards in the slideway 439 until the positioning pin 432 abuts against the rear end of the driving member 434, thereby causing the positioning pin 432, the third connector 431, the first connectors 435, and the support member 41 to be kept at current positions. In this case, the user completes switching the states, and the support member 41 is in the first state. The adjustment guide rail 42 is longer than the second connector 436. That is to say, multiple mounting assemblies 43 may be mounted on the adjustment guide rail 42. That is, multiple bracket tables 40 may be connected to the adjustment guide rail 42, and items, storage boxes 10, and the like may be placed on support members 41. With this configuration, the space in a length direction can be reasonably used so that the items, the storage boxes 10, and the like are prevented from being placed on the ground randomly to cause unreasonable use of the space.

The bracket table 40 may be directly connected to the wall. That is to say, the second connector 436 may be directly mounted to the wall. In this way, the user can hang the items, the storage boxes 10, and the like on the wall.

The present application provides the bracket table 40 having two states. When the bracket table 40 is in an unfolded state, the bracket table 40 can be interlocked with the storage box 10. When the user does not need the bracket table 40, the bracket table 40 may be caused to be in the folded state.

Figure 4:
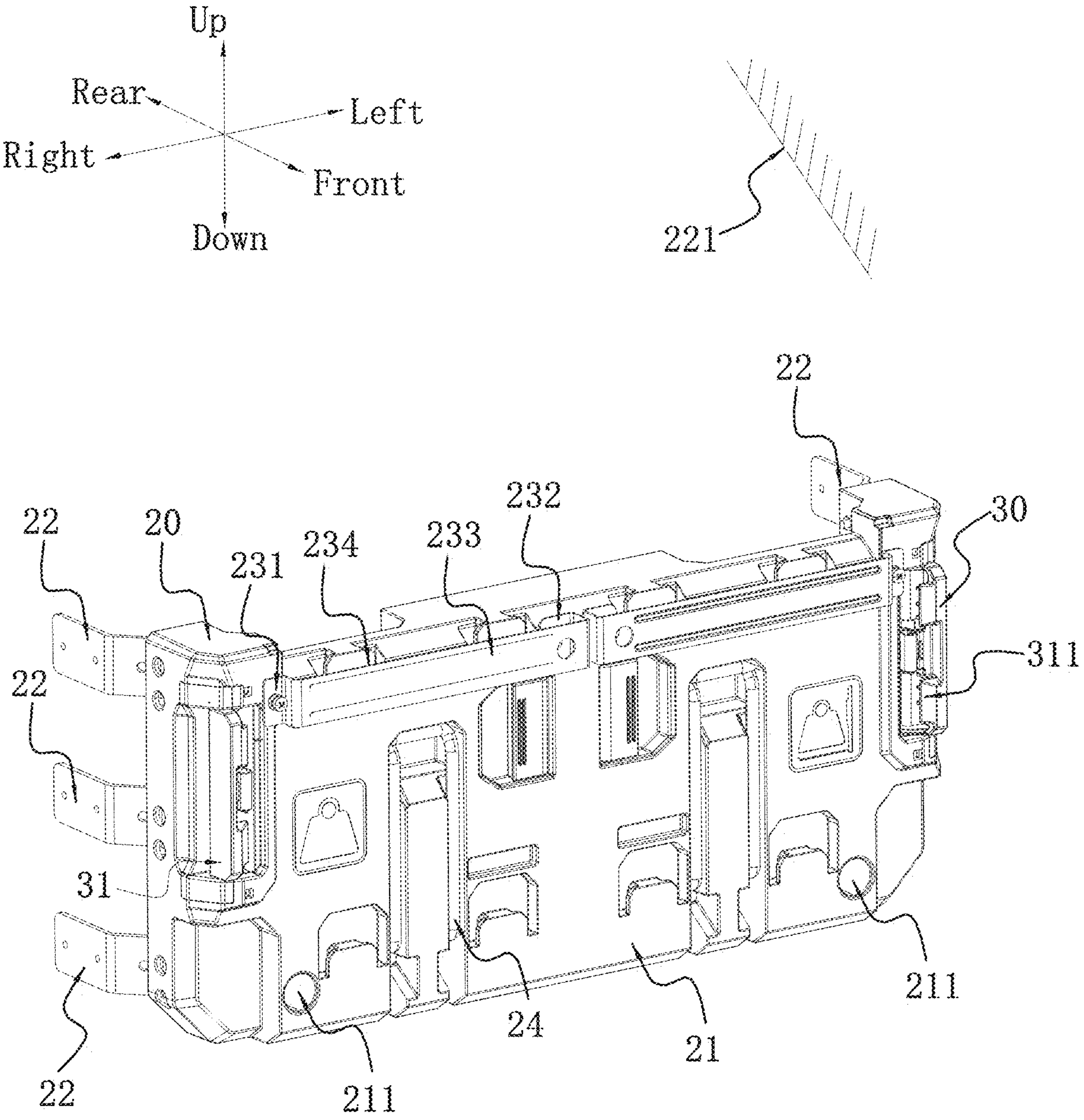
FIG. 4 is a perspective view of an externally connected assembly in FIG. 1 in a folded state.
Figure 5:
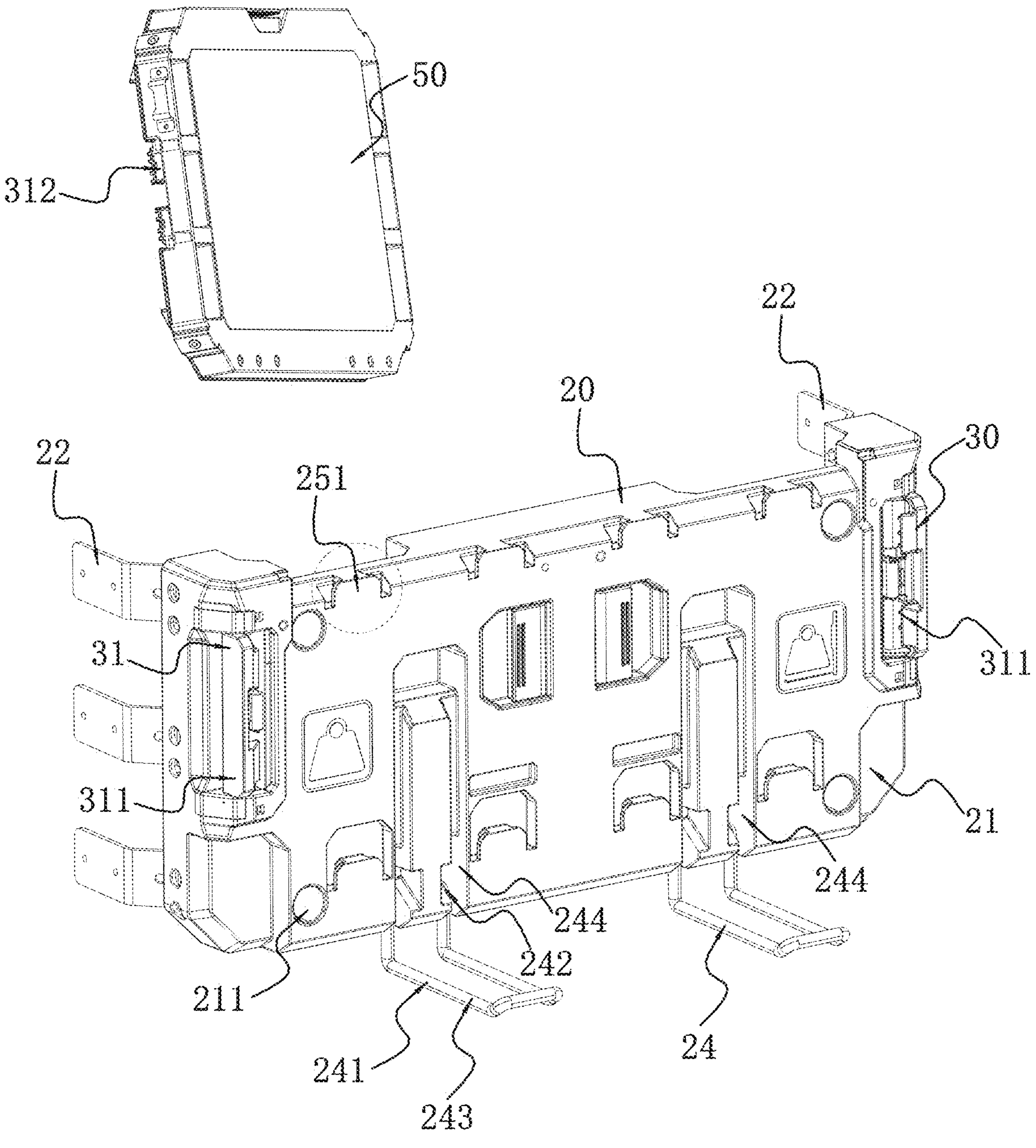
FIG. 5 is a perspective view of an externally connected assembly in FIG. 1 in an unfolded state.
Figure 6:
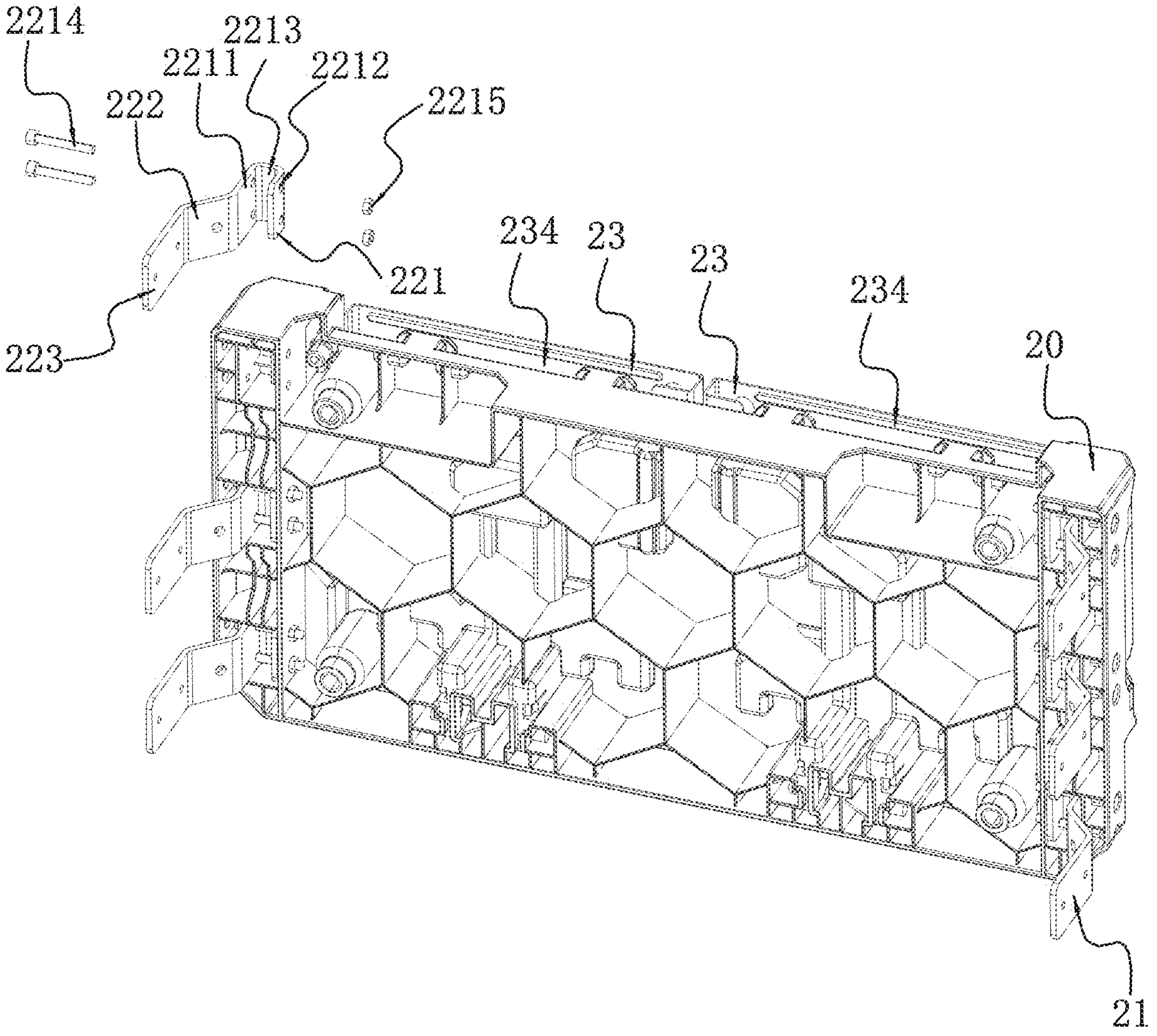
FIG. 6 is an exploded view of a partial structure of an externally connected assembly in FIG. 1.
Figure 7:
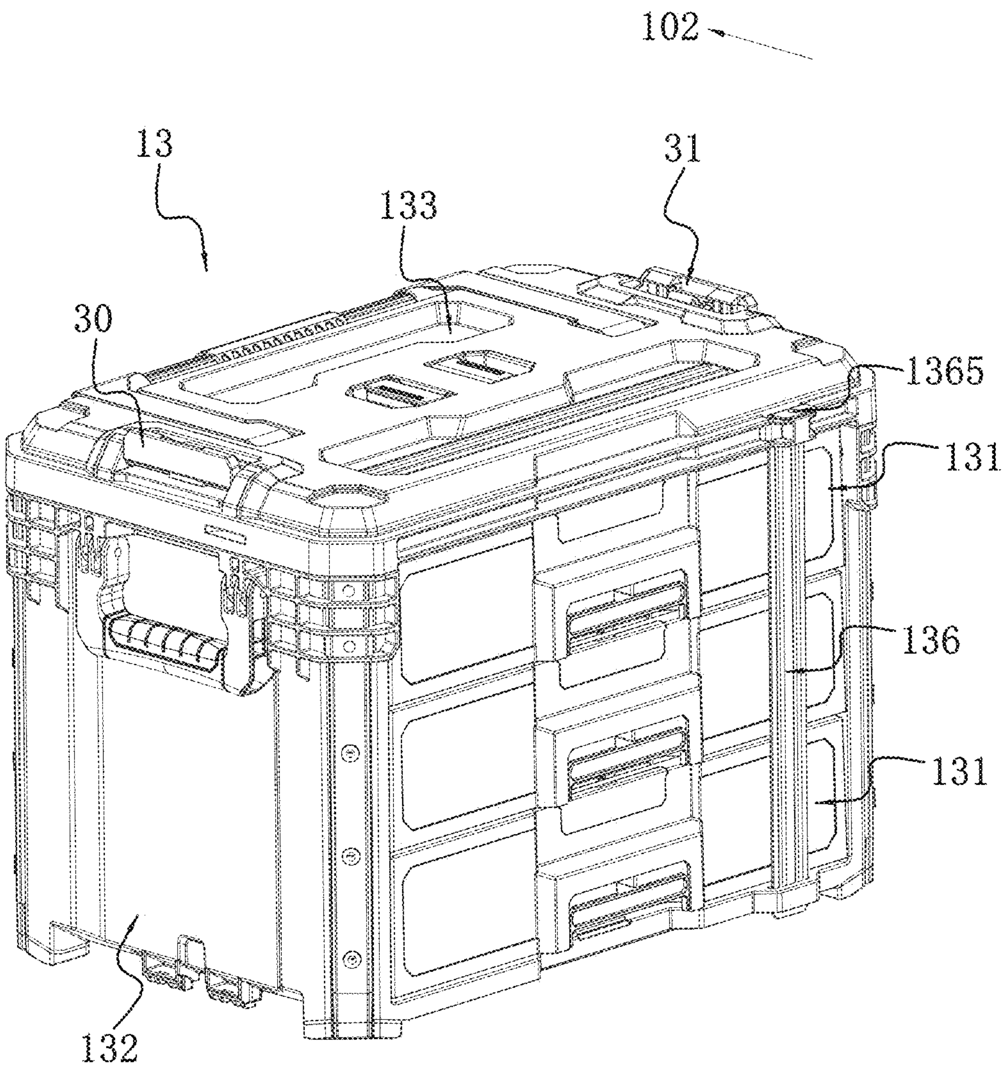
FIG. 7 is a perspective view of a drawer box in a toolbox system.
Figure 8:
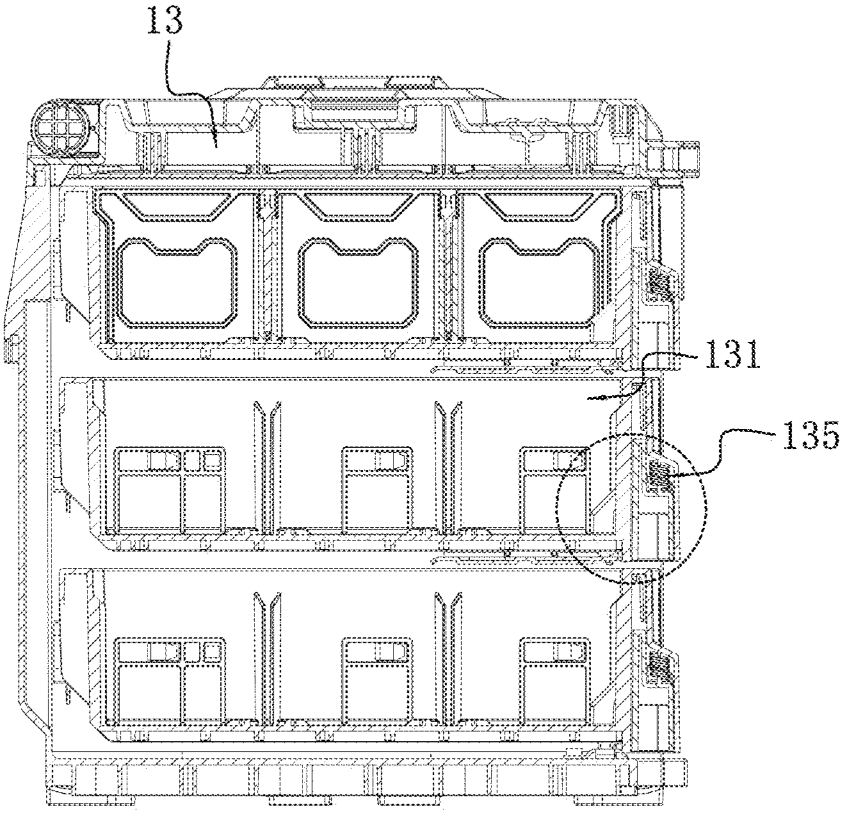
FIG. 8 is a sectional view of the drawer box in FIG. 7 taken along an A-A direction.
Figure 9:
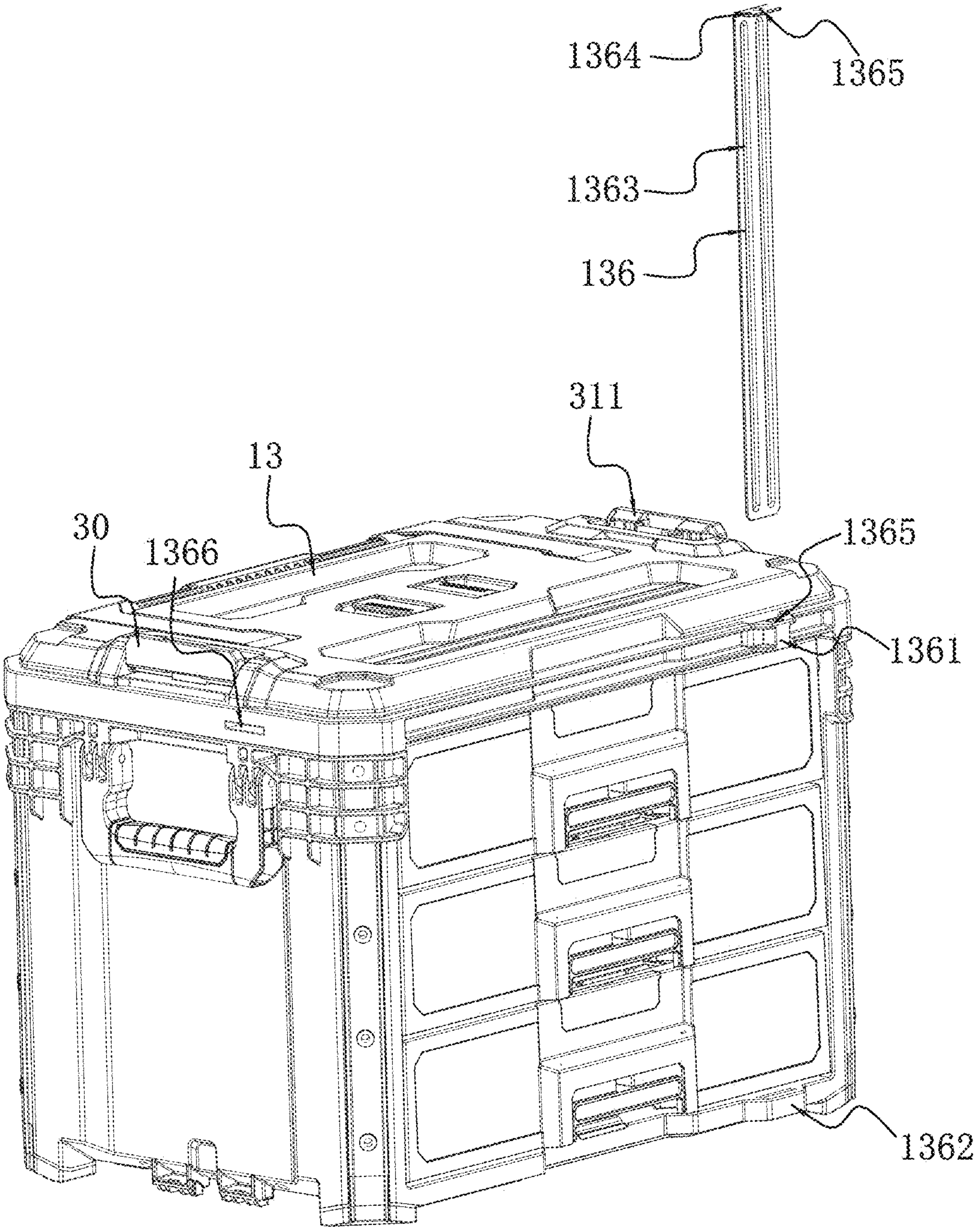
FIG. 9 is a schematic view showing that a locking plate and the drawer box in FIG. 7 are separated from each other.
Figure 10:
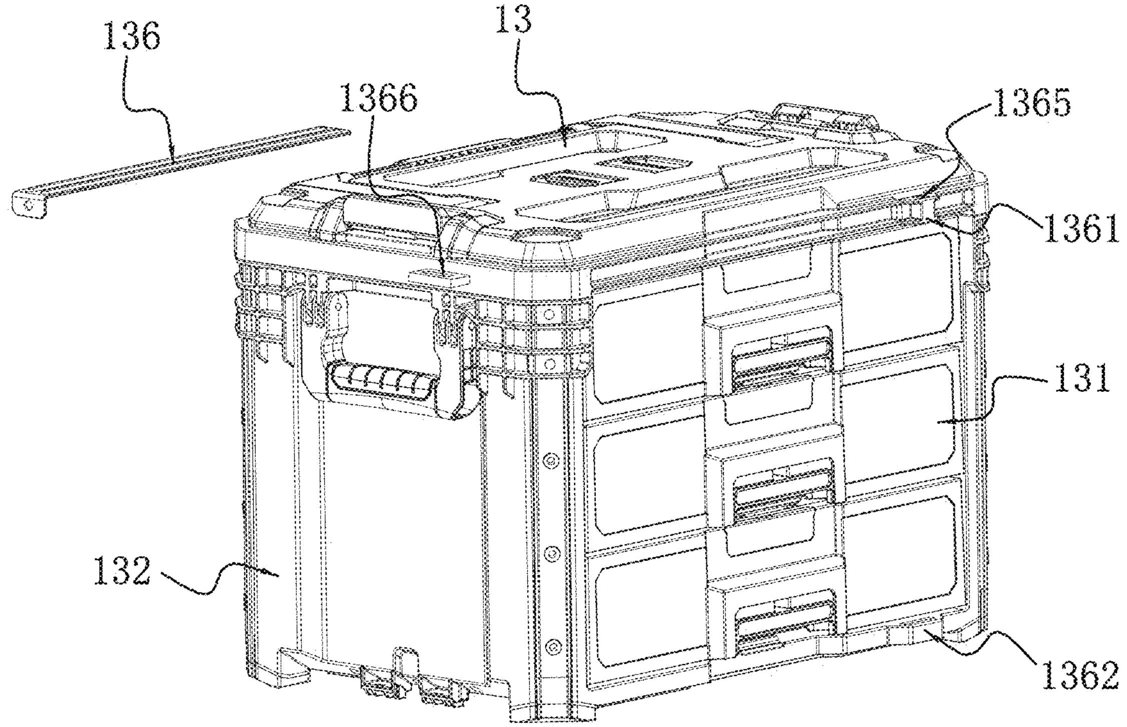
FIG. 10 is an exploded view of a connecting assembly of the drawer box in FIG. 7.
Figure 11:
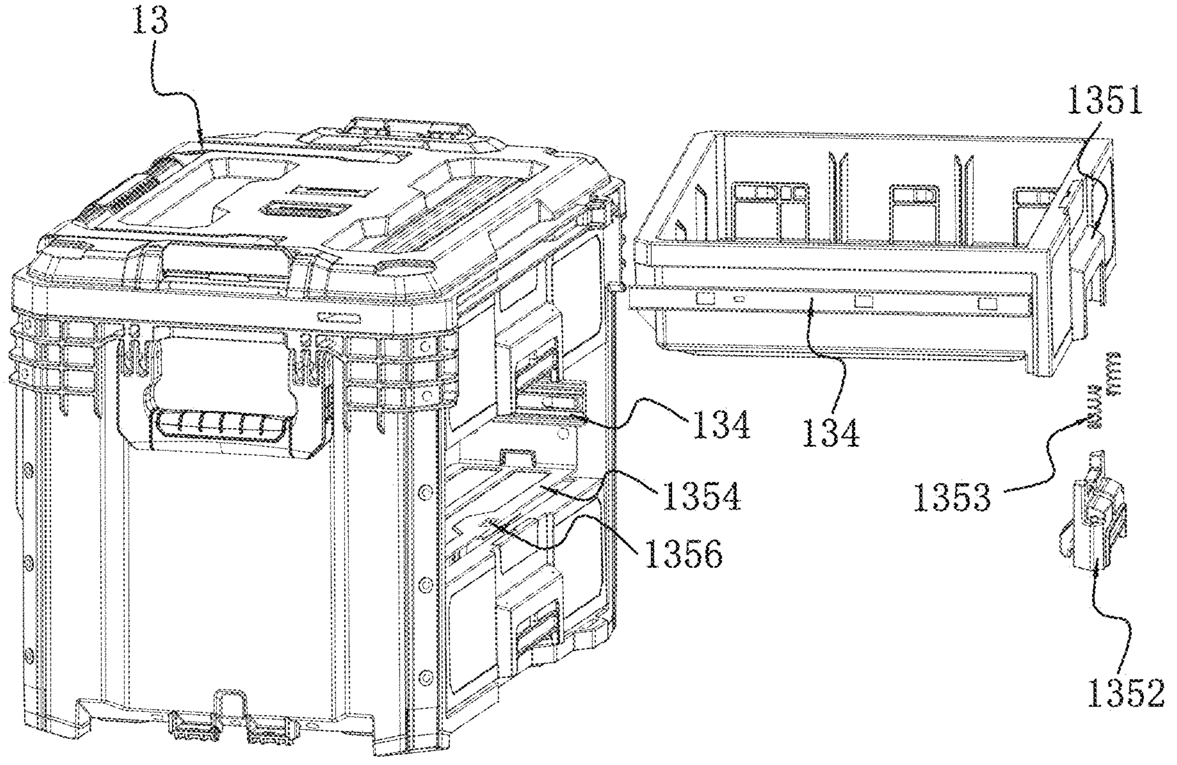
FIG. 11 is an exploded view of a connecting assembly of the drawer box in FIG. 7.
Figure 12:
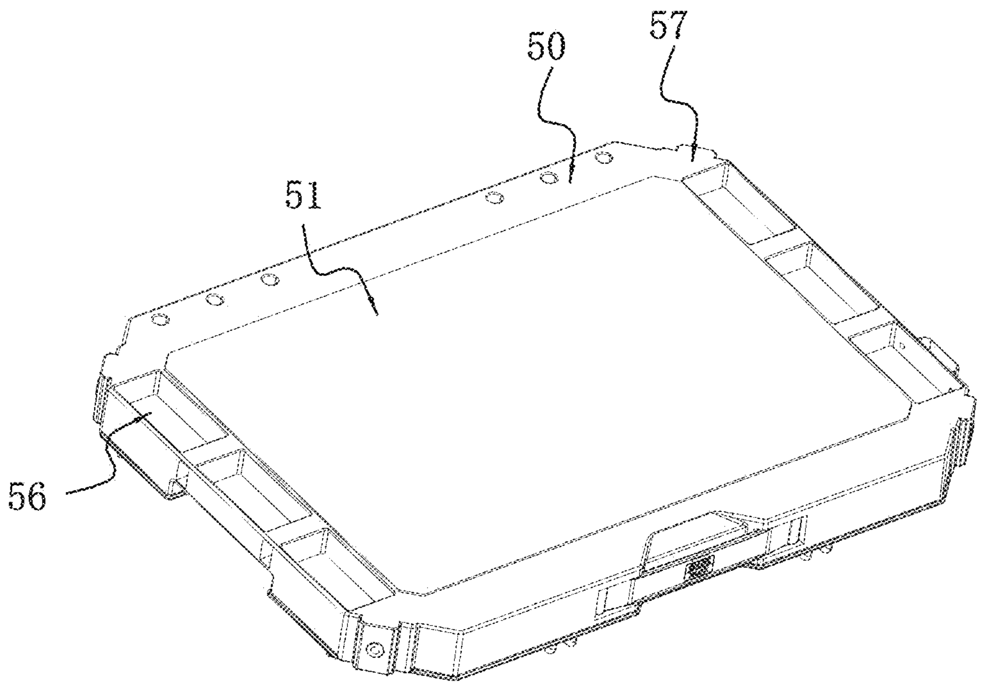
FIG. 12 is a perspective view of the workbench in FIG. 3.
Figure 13:
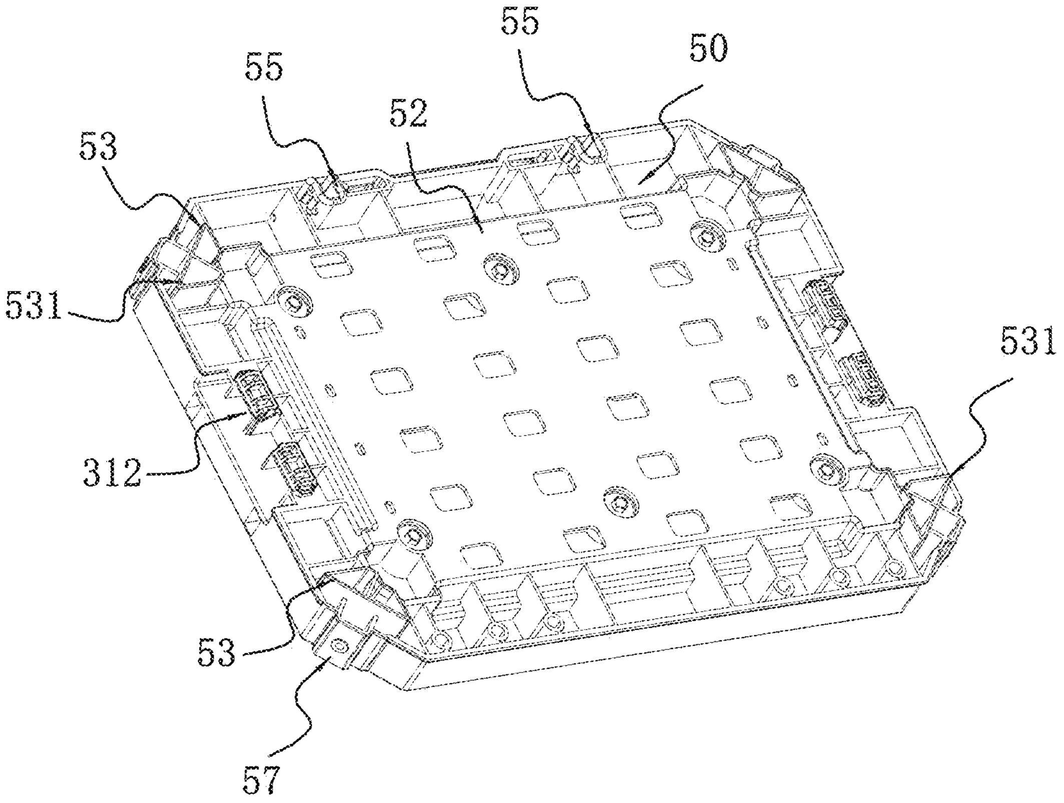
FIG. 13 is a schematic view of the workbench in FIG. 12 from another perspective.
Figure 14:
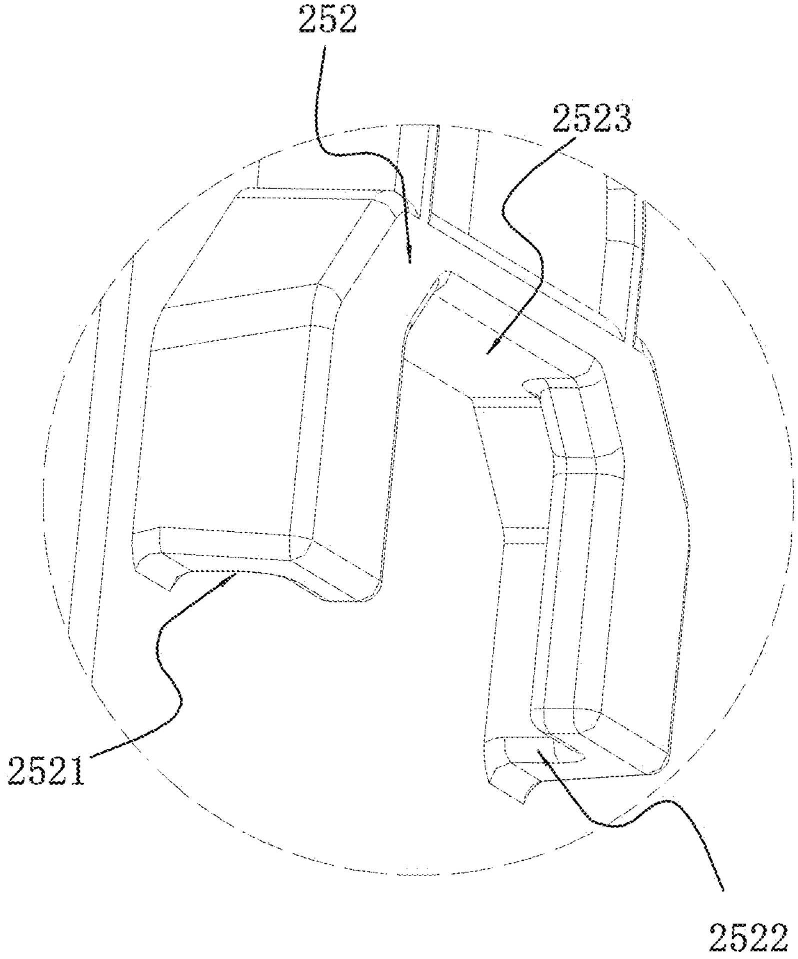
FIG. 14 is a partial enlarged view of FIG. 2.
Figure 15:
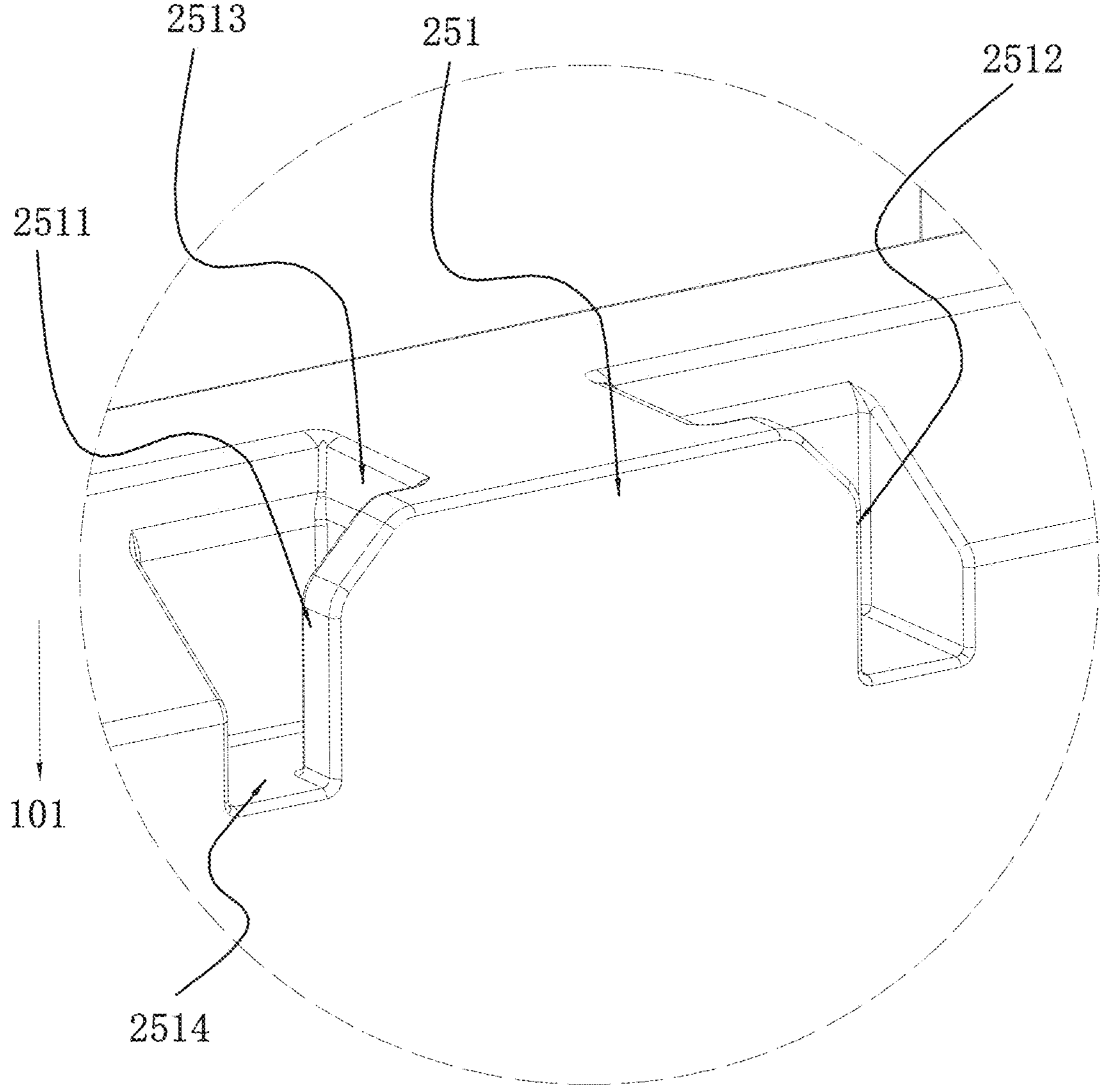
FIG. 15 is a partial enlarged view of FIG. 5.
Figure 16:
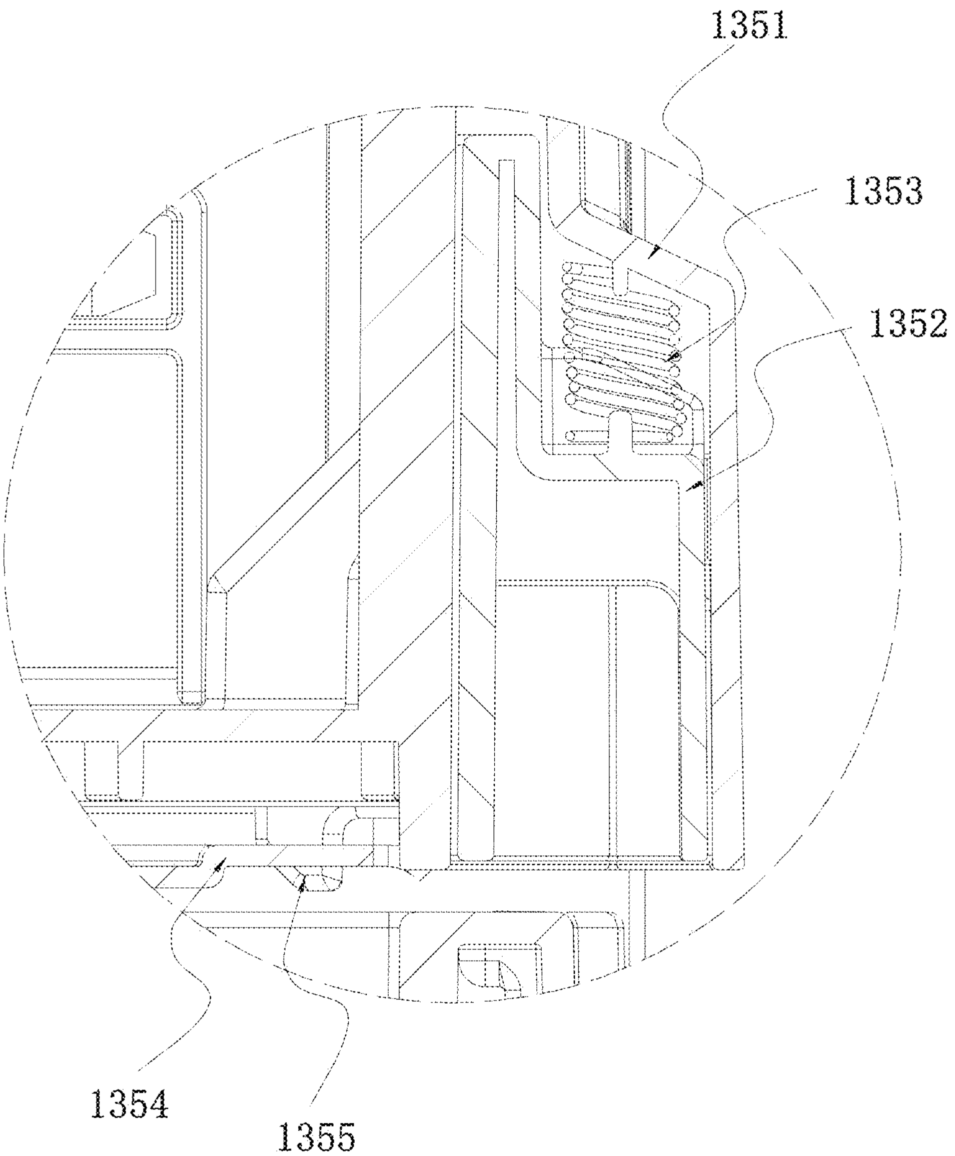
FIG. 16 is a partial enlarged view of FIG. 8.
Figure 17:
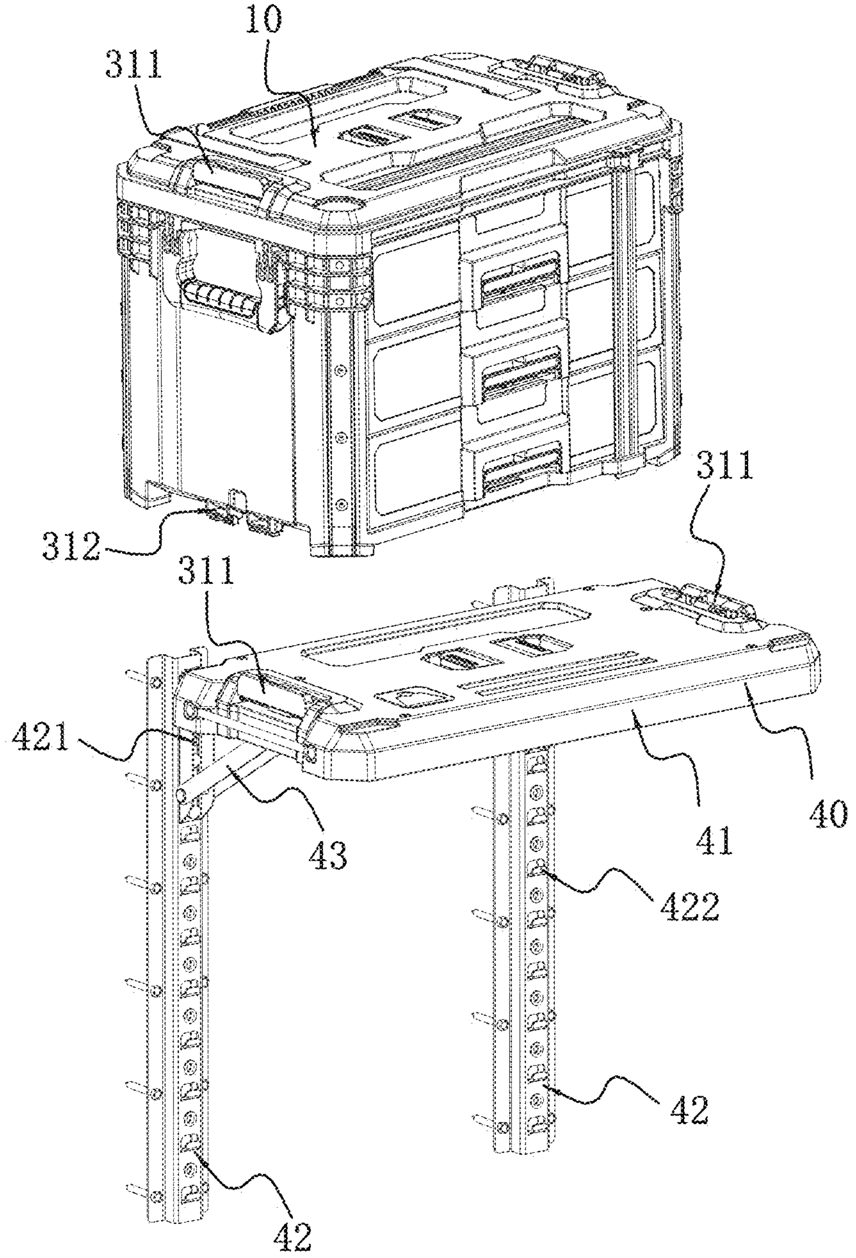
FIG. 17 is a perspective view of a bracket table in a toolbox system, where a support member is in a first state and the support member is in a first position.
Figure 18:
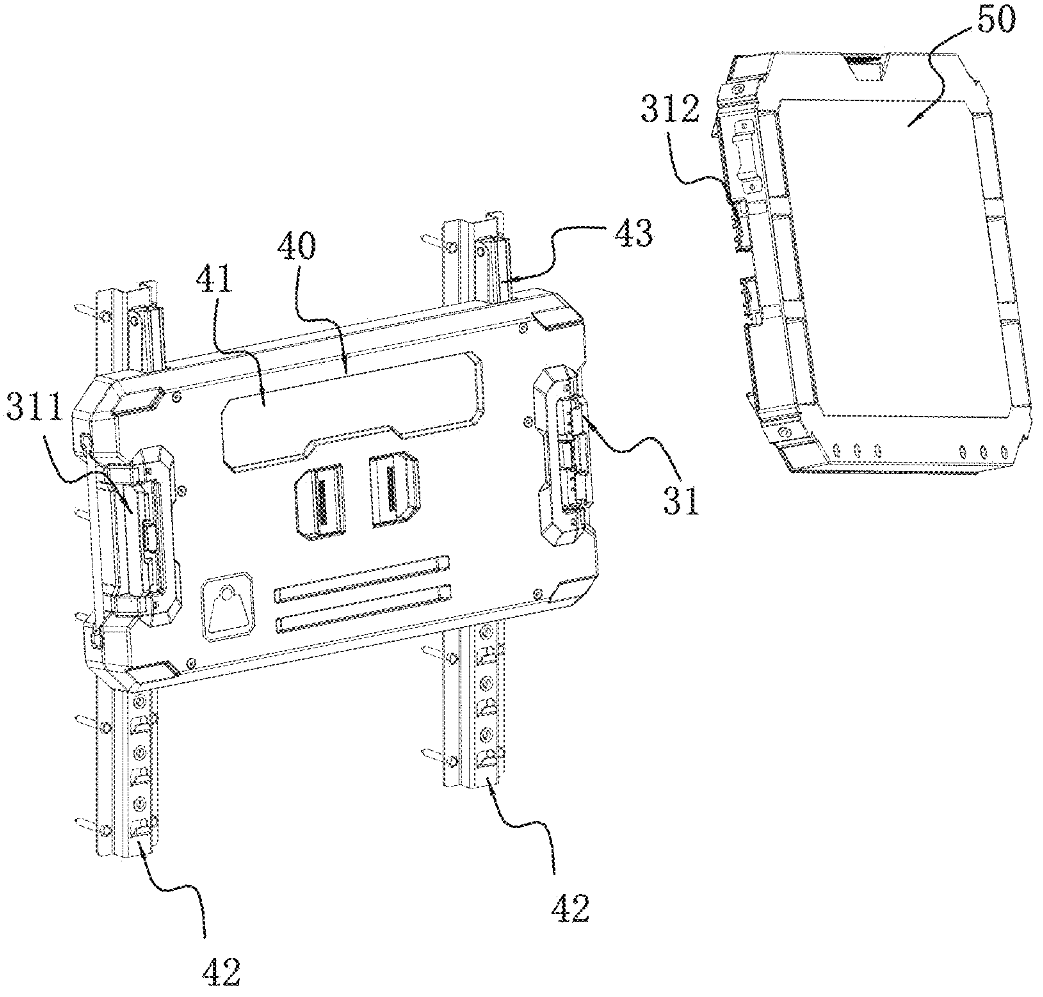
FIG. 18 is a perspective view of a bracket table in a toolbox system, where a support member is in a second state and the support member is in a second position.
Figure 19:
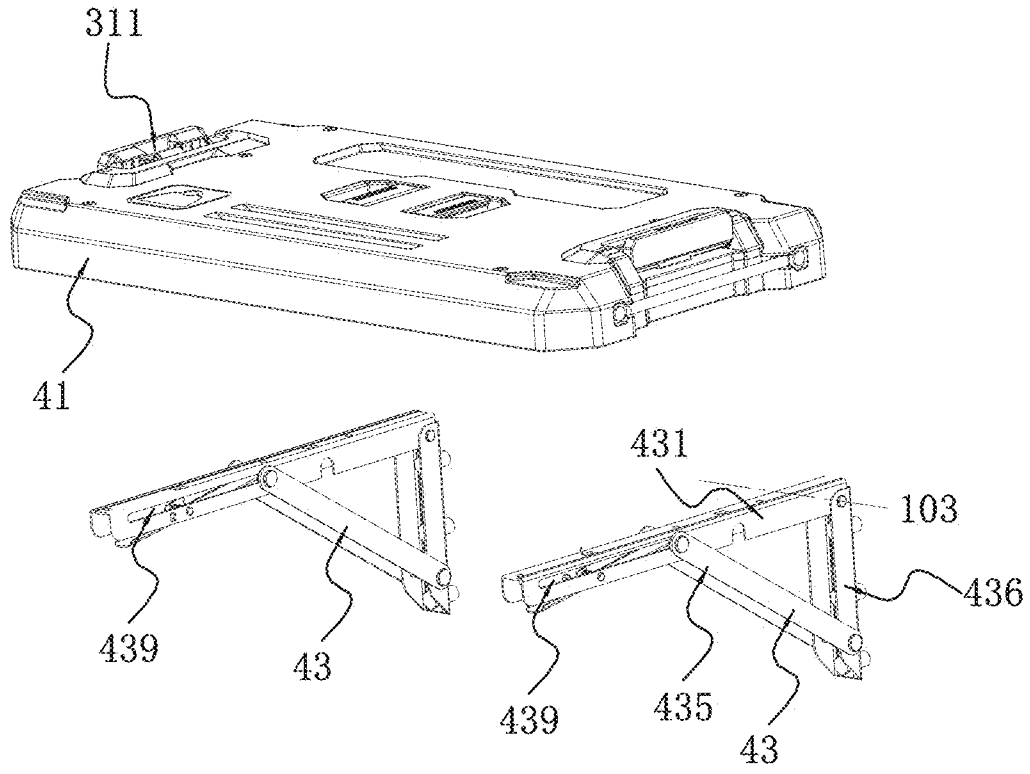
FIG. 19 is a view showing that partial structures of the bracket table in FIG. 17 are separated from each other.
Figure 20:
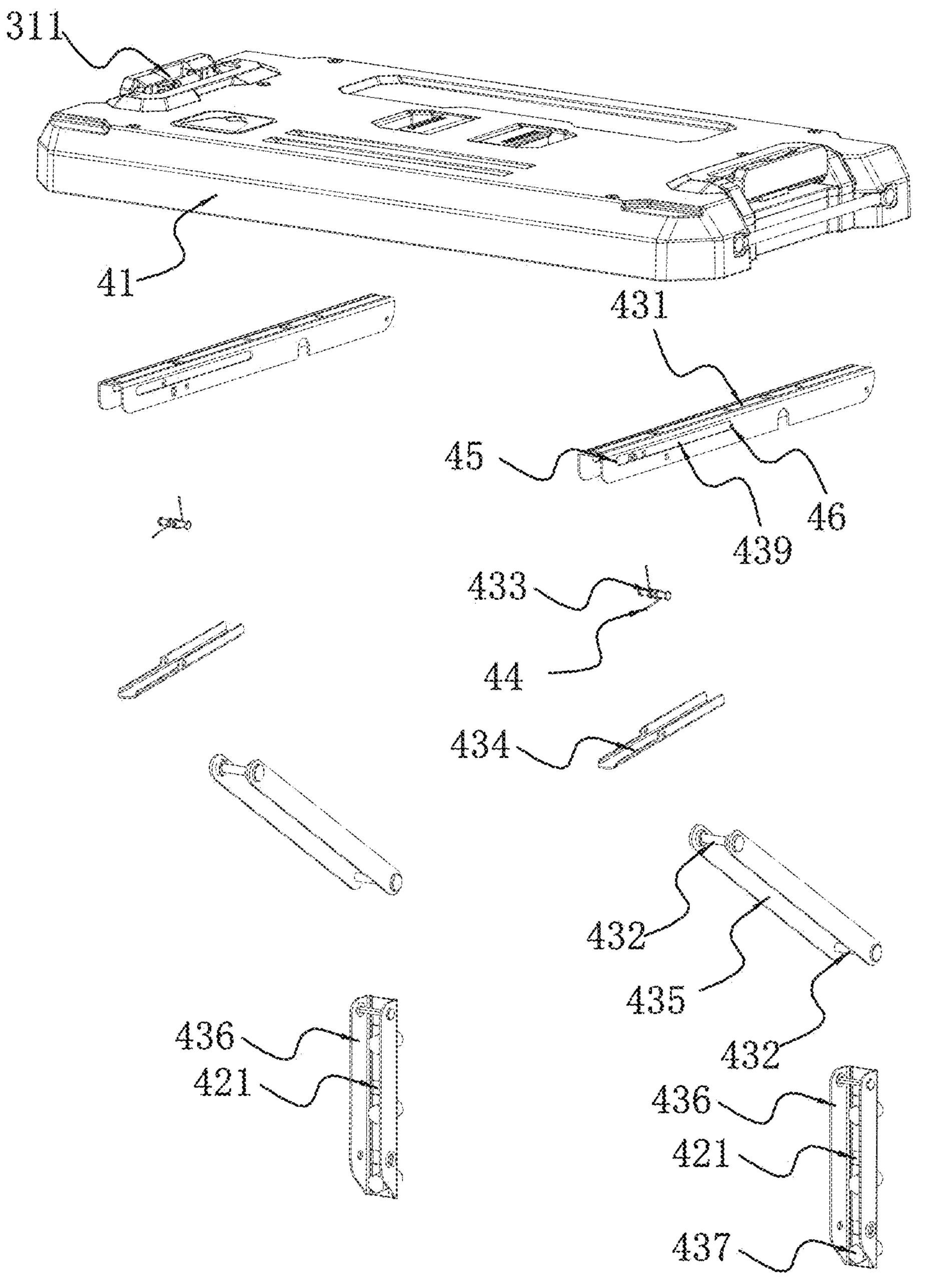
FIG. 20 is an exploded view of partial structures of the bracket table in FIG. 17.

As shown in FIGS. 17 and 4, the structure of the interlocking assembly of the bracket table 40 is basically the same as that of the interlocking assembly 30 of the externally connected assembly 20. As shown in FIG. 17, the interlocking assembly 30 includes snap members 311 and positioning members 312, the snap members 311 are disposed on the bracket table 40, the positioning members 312 are disposed on the storage box 10, and the storage box 10 can be mounted on the bracket table 40 through the cooperation of the snap members 311 and the positioning members 312. When the support member 41 is in the first state, the interlocking assembly 30 is configured to mount at least one of a tool, an accessory, a fan unit, a charging device, a power supply device, an illumination device, the storage box 10, and a workbench to the support member 41.

FIG. 3, FIG. 5, FIG. 12, FIG. 13, and FIG. 18 show a workbench 50. The workbench 50 may be configured to be used for the placement of tools such as a table saw. Alternatively, the workbench 50 may be used as a panel 21 by the user, and the user can do work on the workbench 50. The workbench 50 is approximately quadrilateral.

As an example, the workbench 50 may be connected to the bracket table 40. Snap members 311 capable of springing back are disposed on the support member 41. Positioning members 312 mating with the snap members 311 are connected to the workbench 50. When the snap members 311 mate with the positioning members 312, the workbench 50 and the support member 41 can keep fixed relative to each other. In this way, the workbench 50 may be hung to a wall or another position. The snap members 311 and the positioning members 312 in this example may refer to the preceding interlocking assemblies 30. Similarly, snap members 311 are also disposed on the externally connected assembly 20, and the user may engage the positioning members 312 with the snap members 311 so that the externally connected member 20 and the workbench 50 keep fixed relative to each other.

The toolbox system 100 further includes the first mounting assembly 25 connected to the first-type storage box 11. The first mounting assembly 25 can connect the first-type storage box 11 to the workbench 50 and attach the workbench 50 to the sidewall of the first-type storage box 11. The first mounting assembly 25 refers to a removable connection manner between the workbench 50 and the first-type storage box 11. For example, the workbench 50 and the first-type storage box 11 may be connected to each other through a snap connection, a threaded connection, a screw connection, adsorption, a hook connection, an interference connection, or a combination of multiple connection manners of course.

The workbench 50 has a first connection state and a second connection state. When the workbench 50 is in the first connection state, the workbench 50 is attached to the top cover of the storage box 10. When the workbench 50 is in the second connection state, the workbench 50 is attached to a sidewall of the storage box 10. That is, the workbench 50 may be connected to the outer side of the storage box 10.

The workbench 50 may be connected to the storage box 10. That is, contact surfaces 531 are connected to the workbench 50, connecting surfaces 541 at least in partial contact with the contact surfaces 531 are connected to the storage box 10, and the workbench 50 is movable along with the storage box 10 when the contact surfaces 531 are in contact with the connecting surfaces 541.

As another example, the workbench 50 may be connected to the top cover 133 of the storage box 10. Inserting portions 53 are connected to the workbench 50, and inserted portions 54 are connected to the top cover 133 of the storage box 10. The inserted portions 54 form the connecting surfaces 541, and the inserting portions 53 form the contact surfaces 531. The inserting portions 53 may be directly inserted into the inserted portions 54, thereby keeping the workbench 50 and the storage box 10 fixed relative to each other. The workbench 50 includes a front end surface 51 and a rear end surface 52 that are disposed opposite to each other. The front end surface 51 may be used by the user to work, place a table saw, or the like. At least one raised inserting portion 53 is formed on the rear end surface 52. The four inserting portions 53 are formed on the rear end surface 52 and disposed at the four corners of the rear end surface 52 separately. The top cover 133 of the storage box 10 is formed with the recessed inserted portions 54 corresponding to the inserting portions 53. The inserted portions 54 are disposed at the four corners of the top cover 133 separately. The snap members 311 capable of springing back are disposed on the top cover 133 of the storage box 10. The positioning members 312 may also be disposed on the storage box 10. For example, the positioning members 312 are disposed at the lower end of the storage box 10. In this way, the user may interlock multiple storage boxes 10 together and insert the workbench 50 into the top cover 133 of the uppermost storage box 10. The user may use the multiple storage boxes 10 and the workbench 50 as a table. For example, in some construction sites, the multiple storage boxes 10 and the workbench 50 may be used as the table.

The workbench 50 may be connected to the movable container box. The user stacks the storage box 10 on the movable container box to adjust the height. With this configuration, the storage box 10 and the movable container box can form a movable stable, and the user can do the work on the workbench 50. When the user needs to move the storage box 10 to carry the items, the user may place the table saw on the workbench 50 and use a rope to tie the table saw to prevent the table saw from falling. In this way, the space in the storage box 10 can be saved so that more items are placed in the storage box 10.

Hanging portions 55 may also be connected to the workbench 50. The hanging portions 55 and the workbench 50 are fixedly connected to each other or integrally formed. The hanging portions 55 are disposed on the rear end surface 52 of the workbench 50. At least one hanging portion 55 may be disposed on the workbench 50. In this example, the two hanging portions 55 are disposed on the workbench 50. The user can hang, through the hanging portions 55, the workbench 50 to any position to which the workbench 50 can be hung.

The workbench 50 further includes storage slots 56 disposed on the front end surface 51. The storage slots 56 are disposed around the front end surface 51.

Connecting segments 57 are formed at the corners of the outer edge of the workbench 50. The toolbox system 100 further includes an externally hanging assembly 60 including an intermediate member 61 and the external hanger 62. The external hanger 62 can be detachably connected to the item. The external hanger 62 includes a battery pack hanger, a cable hanger, a scale hanger, a power tool hanger, an accessory hanger, and the support member 23, which may be configured to be used for separately hanging the battery pack, a cable, s scale, the power tool, the accessory, and the like. Multiple external hangers 62 may be disposed on the storage box 10. The external hanger 62 may be one of or a combination of the battery pack hanger, the cable hanger, the scale hanger, the support member 23, and the power tool hanger. The intermediate member 61 is fixedly connected to the workbench 50 in a detachable manner. That is, the intermediate member 61 may be connected to the workbench 50 through one or a combination of several of a screw, a pin, a rivet, and a movable snap 422. The intermediate member 61 is connected to a connecting segment 57 of the workbench 50. That is, the intermediate member 61 may be mounted on each of the four connecting segments 57 of the workbench 50. The support member 23 may be mounted between two intermediate members 61, and the user can hang the tool and the like on the support member 23.

Figure 23:
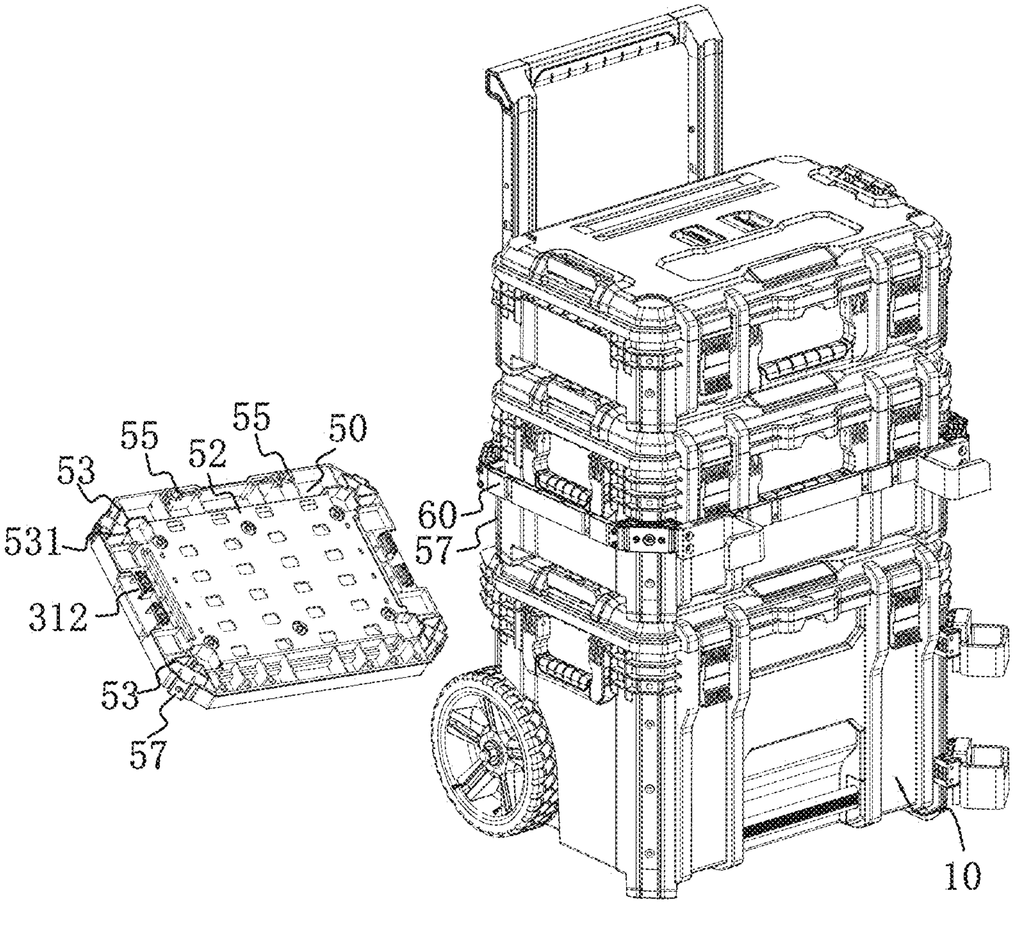
FIG. 23 is a schematic view showing that a workbench is attached to a sidewall of a storage box.

As shown in FIG. 23, the user may detach the externally hanging assembly 60 connected to the outer edge of the workbench 50 and connect the externally hanging assembly 60 to the connecting segments 57 of the storage box 10 according to the needs. The user connects the externally hanging assembly 60 to the connecting segment 57 of the storage box 10. The workbench 50 may be hung, through the hanging portion 55, on a slot formed by the externally hanging assembly 60. In this way, the workbench 50 may be attached to the sidewall of the storage box 10.

What is claimed is:

1. A bracket table applicable to a storage box, comprising:

a support member configured to support the storage box and comprising an interlocking assembly for interlocking with the storage box; and a mounting assembly connected to the support member and used to place the support member into one of a first state or a second state, the mounting assembly comprising:

a first connector connected to the support member;

a second connector rotatably connected to the first connector;

a third connector having a first positioning pin attached to a first end of the third connector and a second positioning pin positioned at a second end of the third connector opposite the first end, the third connector slidably connected to the first connected via the first positioning pin and rotatably connected to the second connector via the second positioning pin;

a resilient member fixed to the first connector, the resilient member having an arm; and a driving member coupled to the first connector and receiving a biasing force from the arm that causes an end of the driving member to remain in contact with the first connector to thereby bias the mounting assembly into the first state.

2. The bracket table according to claim 1, wherein the first connector is configured to be mounted to at least one of a wall, ground, a goods shelf, and a wood board.

3. The bracket table according to claim 2, wherein, when the support member is in the first state, the interlocking assembly is configured to mount at least one of a tool, an accessory, a fan unit, a charging device, a power supply device, an illumination device, a storage box, and a workbench to the support member.

4. The bracket table according to claim 3, wherein the first connector is connected to the support member through at least one of a threaded connection, a mortise and tenon connection, a screw connection, a pin connection, and a snap connection.

5. The bracket table according to claim 4, wherein an included angle between the support member in the first state and the support member in the second state is greater than or equal to 30 degrees.

6. The bracket table according to claim 1, wherein the second connector is configured to be mounted to at least one of a wall, ground, a goods shelf, and a wood board.

7. The bracket table according to claim 6, wherein, when the support member is in the second state, an included angle between the support member and the second connector is less than 80 degrees.

8. The bracket table according to claim 1, further comprising an adjustment guide rail detachably connected to the mounting assembly, wherein the second connector is mounted to the adjustment guide rail.

9. The bracket table according to claim 8, wherein a plurality of snaps are disposed on the adjustment guide rail, a plurality of engagement slots are disposed on the second connector, an engagement slot among the plurality of engagement slots is engaged with a respective snap among the plurality of snaps, and a number of the plurality of snaps on the adjustment guide rail is greater than a number of the plurality of engagement slots on the second connector.

10. The bracket table according to claim 8, wherein the mounting assembly further comprises fasteners and the fasteners pass through holes of the second connector and through holes of the adjustment guide rail to fixedly connect the second connector to the adjustment guide rail.

11. The bracket table according to claim 10, further comprising a further mounting assembly connected to the support member, the further mounting assembly comprising:

a further first connector connected to the support member;

a further second connector rotatably connected to the further first connector;

a further third connector having a further first positioning pin attached to a first end of the further third connector and a further second positioning pin positioned at a second end of the further third connector opposite the first end, the further third connector slidably connected to the further first connected via the further first positioning pin and rotatably connected to the further second connector via the further second positioning pin;

a further resilient member fixed to the further first connector, the further resilient member having a further arm; and a further driving member coupled to the further first connector and receiving a further biasing force from the further arm that causes an end of the further driving member to remain in contact with the further first connector to thereby bias the further mounting assembly into the first state.

12. The bracket table according to claim 1, wherein, when the support member is at the first position, the interlocking assembly is configured to mount at least one of a tool, an accessory, a fan unit, a charging device, a power supply device, an illumination device, a storage box, and a workbench to the support member.

13. The bracket table according to claim 12, wherein the interlocking assembly comprises a snap assembly comprising a snap member capable of springing back and a positioning member, the snap member is connected to the support member, and the positioning member is configured to be disposed on any one of the tool, the accessory, the fan unit, the charging device, the power supply device, the illumination device, the storage box, and the workbench.

14. A bracket table applicable to a storage box, comprising:

a support member having an interlock member configured to be mechanically interlocked with a corresponding interlock member of the storage box; and a mounting assembly connected to the support member and comprising a first connector connected to the support member, wherein the first connector has a first position and a second position where an included angle between the support member at the first position and the support member at the second position is greater than or equal to 30 degrees.

* * * * *